United States Patent
Yang

(10) Patent No.: US 11,062,607 B2
(45) Date of Patent: Jul. 13, 2021

(54) SYSTEMS AND METHODS FOR QUANTITATIVELY ASSESSING COLLISION RISK AND SEVERITY

(71) Applicant: Kennesaw State University Research And Service Foundation, Inc, Kennesaw, GA (US)

(72) Inventor: Jidong Yang, Johns Creek, GA (US)

(73) Assignees: Kennesaw State University Research and Service Foundation, Inc., Kennesaw, GA (US); University of Georgia Research Foundation, Inc., Athens, GA (US)

( * ) Notice: Subject to any disclaimer, the term of this patent is extended or adjusted under 35 U.S.C. 154(b) by 65 days.

(21) Appl. No.: 16/490,743

(22) PCT Filed: Mar. 2, 2018

(86) PCT No.: PCT/US2018/020767
§ 371 (c)(1),
(2) Date: Sep. 3, 2019

(87) PCT Pub. No.: WO2018/161037
PCT Pub. Date: Sep. 7, 2018

(65) Prior Publication Data
US 2020/0005648 A1    Jan. 2, 2020

Related U.S. Application Data

(63) Continuation of application No. 15/653,787, filed on Jul. 19, 2017, now Pat. No. 10,522,040.
(Continued)

(51) Int. Cl.
*G08G 1/16* (2006.01)
*G08G 1/01* (2006.01)
(Continued)

(52) U.S. Cl.
CPC ......... *G08G 1/166* (2013.01); *G06K 9/00785* (2013.01); *G06K 9/00791* (2013.01);
(Continued)

(58) Field of Classification Search
CPC .... G08G 1/166; G08G 1/0112; G08G 1/0116; G08G 1/0129; G08G 1/0133;
(Continued)

(56) References Cited

U.S. PATENT DOCUMENTS

2002/0135507 A1\* 9/2002 Winner .................... B60T 7/22
342/70
2008/0040023 A1   2/2008 Breed et al.
(Continued)

FOREIGN PATENT DOCUMENTS

| CN | 103236191 A | 8/2013 |
|---|---|---|
| WO | 2014020315 A1 | 2/2014 |
| WO | 20150188905 A1 | 12/2015 |

OTHER PUBLICATIONS

International Search Report and Written Opinion for App. No. PCT/US2018/020764; dated Aug. 22, 2018; 6 pages.

*Primary Examiner* — Emily C Terrell
(74) *Attorney, Agent, or Firm* — Smith, Gambrell & Russell, LLP

(57) ABSTRACT

Systems and methods for quantitatively assessing collision risk of bodies, such as vehicles, and severity of a conflict between the bodies are disclosed. A method may comprise receiving image data associated with bodies. Based on the image data, an affinity (proneness) to collision of the bodies may be determined. Based on the determined affinity (proneness) to collision, a proximity (closeness) of collision of the bodies may be determined. Based on the determined proximity (closeness) of collision of the bodies, a collision risk of the bodies may be determined. The determined collision risk may be transmitted to a computing device, such as via (Continued)

a user interface. The determined collision risk may be used to control operations of a traffic control device or an autonomous vehicle.

19 Claims, 34 Drawing Sheets

Related U.S. Application Data

(60) Provisional application No. 62/466,953, filed on Mar. 3, 2017.

(51) Int. Cl.
*G06K 9/00* (2006.01)
*G08G 1/04* (2006.01)
*G08G 1/095* (2006.01)

(52) U.S. Cl.
CPC ....... *G06K 9/00805* (2013.01); *G08G 1/0112* (2013.01); *G08G 1/0116* (2013.01); *G08G 1/0129* (2013.01); *G08G 1/0133* (2013.01); *G08G 1/0141* (2013.01); *G08G 1/04* (2013.01); *G08G 1/095* (2013.01); *G08G 1/164* (2013.01)

(58) Field of Classification Search
CPC ........ G08G 1/0141; G08G 1/04; G08G 1/095; G08G 1/164; G06K 9/00785; G06K 9/00791; G06K 9/00805
USPC .......................... 340/441, 903, 907; 701/301
See application file for complete search history.

(56) References Cited

U.S. PATENT DOCUMENTS

| | | |
|---|---|---|
| 2008/0167819 A1 | 7/2008 | Breed |
| 2011/0071750 A1 | 3/2011 | Giovino et al. |
| 2014/0037138 A1* | 2/2014 | Sato ................. G06K 9/00805 382/103 |
| 2014/0372016 A1 | 12/2014 | Buchholz et al. |
| 2015/0003671 A1* | 1/2015 | Saitwal ............... G06K 9/6284 382/103 |
| 2015/0365664 A1 | 12/2015 | Yousefi et al. |
| 2016/0260328 A1 | 9/2016 | Mishra et al. |
| 2017/0053169 A1 | 2/2017 | Cuban et al. |
| 2017/0154241 A1 | 6/2017 | Shambik et al. |
| 2017/0177937 A1 | 6/2017 | Harmsen et al. |
| 2017/0206238 A1 | 7/2017 | Coutinho et al. |
| 2018/0075309 A1 | 3/2018 | Sathyanarayana et al. |
| 2018/0151072 A1 | 3/2018 | Altinger et al. |
| 2018/0212684 A1 | 7/2018 | Aoyama et al. |
| 2018/0239982 A1 | 8/2018 | Rutschman et al. |
| 2018/0253973 A1* | 9/2018 | Yang .................... G08G 1/166 |
| 2018/0259968 A1* | 9/2018 | Frazzoli ............... G05D 1/0223 |
| 2018/0365635 A1 | 12/2018 | Lucrecio et al. |

* cited by examiner

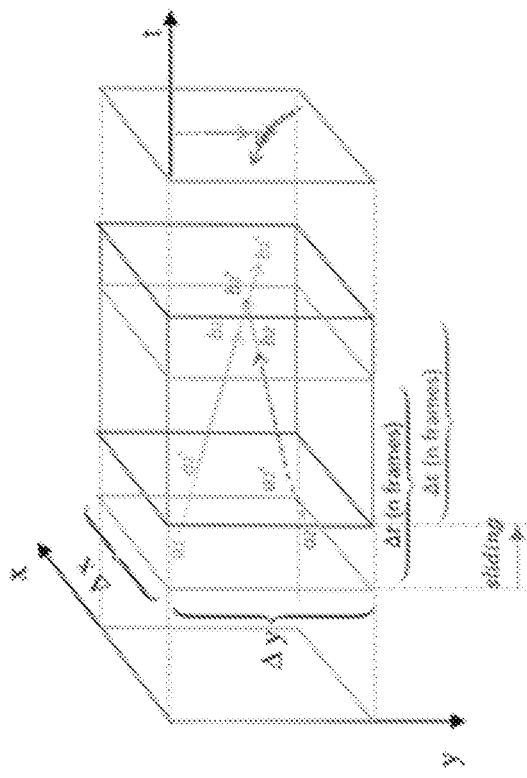
FIG. 5A
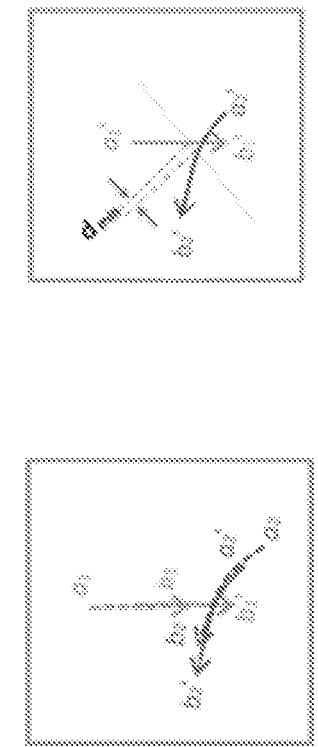
FIG. 5B
FIG. 5C
FIG. 5D
FIG. 5E

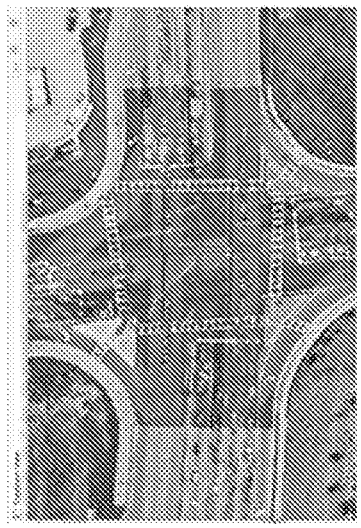
FIG. 9A
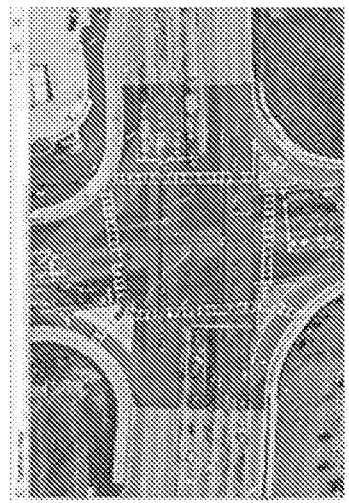
FIG. 9B
FIG. 9C
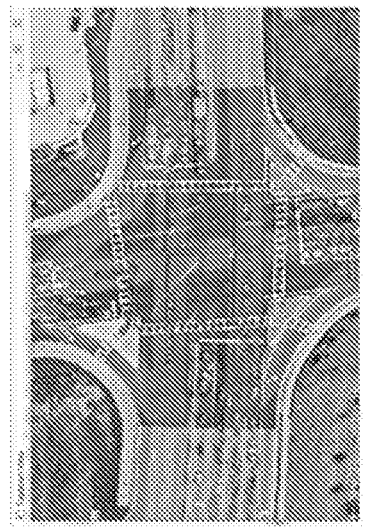
FIG. 9D

```
┌─────────────────────────────────────────┐
│ Determine probability of collision of   │
│ bodies for a plurality of observations  │
│                  241                    │
└─────────────────────────────────────────┘
                    │
                    ▼
┌─────────────────────────────────────────┐
│ Sort the observations by probability    │
│ of collision                            │
│                  242                    │
└─────────────────────────────────────────┘
                    │
                    ▼
┌─────────────────────────────────────────┐
│ Perform a cluster analysis on the       │
│ sorted observations                     │
│                  243                    │
└─────────────────────────────────────────┘
                    │
                    ▼
┌─────────────────────────────────────────┐
│ Determine features points of the        │
│ observations and frequency per cluster  │
│                  244                    │
└─────────────────────────────────────────┘
                    │
                    ▼
┌─────────────────────────────────────────┐
│ Determine cumulative frequencies and    │
│ cumulative collision risks of the       │
│ observations                            │
│                  245                    │
└─────────────────────────────────────────┘
                    │
                    ▼
┌─────────────────────────────────────────┐
│ Determine the parameters based on the   │
│ cumulative frequency and cumulative risk│
│                  246                    │
└─────────────────────────────────────────┘
                    │
                    ▼
┌─────────────────────────────────────────┐
│ Compare the estimated parameters with   │
│ estimated parameters from a previous    │
│ iteration                               │
│                  247                    │
└─────────────────────────────────────────┘
```

FIG. 24

SYSTEMS AND METHODS FOR QUANTITATIVELY ASSESSING COLLISION RISK AND SEVERITY

CROSS-REFERENCE TO RELATED APPLICATION

This application is a National Phase filing of International (PCT) Application Number PCT/US18/20764, filed Mar. 2, 2018, which claims priority to U.S. Nonprovisional application Ser. No. 15/653,787, filed Jul. 19, 2017, which claims the benefit of U.S. Provisional Application No. 62/466,953, filed Mar. 3, 2017, each of which is hereby incorporated by reference in their entirety.

BACKGROUND

Research in traffic collision events has focused on classifying conflict events by various parameters, such as time-to-collision, post-encroachment time, and initial deceleration rate of a vehicle. The methods developed for classifying conflict events are not adapted to quantify a traffic conflict or the risk of a traffic conflict, such as an imminent collision, between two or more bodies. Human assessment also fails to accurately quantify a traffic conflict, as the perception of the human eye varies based on angle and distance of a line of sight.

Furthermore, the methods developed for determining the severity of a traffic conflict rely on assumed driver behaviors, which accounts for inaccuracy in computations. For example, methods rely on the assumption that two bodies applied brakes prior to arriving at a collision point.

SUMMARY

Systems and methods may comprise quantitatively assessing collision risk of bodies, such as vehicles in traffic, and severity of a conflict between the bodies. Image data associated with bodies may be received. Based on the image data, a proneness to collision of the bodies may be determined. Based on the determined proneness to collision, a closeness of collision of the bodies may be determined. Based on the determined closeness of collision of the bodies, a collision risk of the bodies may be determined. The determined collision risk may be transmitted to a computing device, such as a user device, a traffic control device, or an autonomous vehicle. An indication of the determined collision risk may be caused to be output via a user interface, such as a graphic representation of motion of the bodies output via a graphic user interface. Based on the determined collision risk, a traffic control device may be caused to execute an operation, such as modifying a traffic signal or triggering an alert. Based on the determined collision risk, an autonomous vehicle may execute an operation, such as changing its route or communicating with another autonomous vehicle.

BRIEF DESCRIPTION OF THE DRAWINGS

The following drawings illustrate generally, by way of example, but not by way of limitation, various examples discussed in the present disclosure. In the drawings:

FIGS. 5A-5E show example progression of the trajectories in FIG. 4.
FIGS. 9A-9D show example tracking methods.
FIG. 24 shows an example method.

DETAILED DESCRIPTION

Figure 1A:
FIGS. 1A-1D show example geospatial references.
Figure 1B:
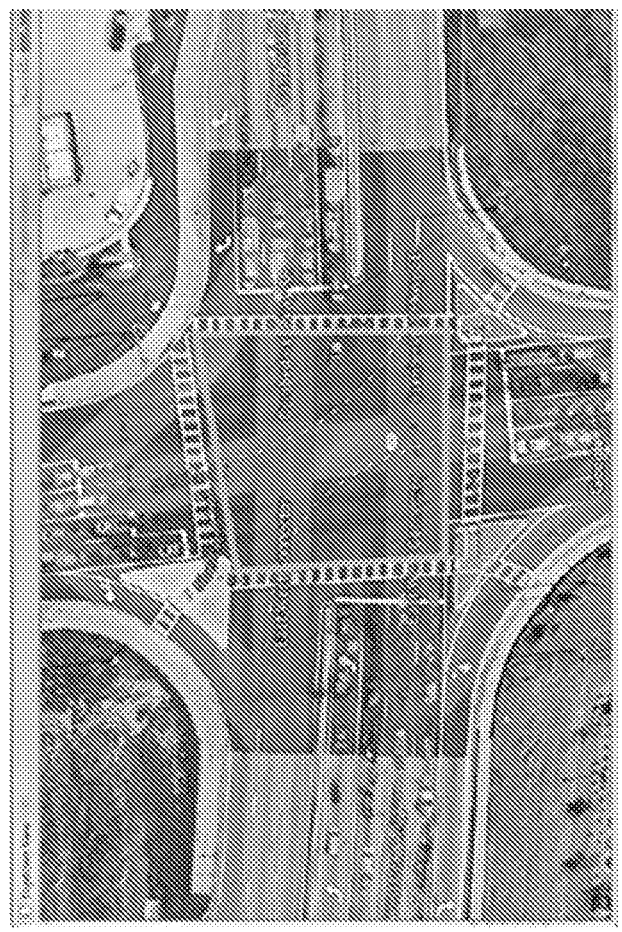
Figure 1C:

A "traffic conflict" may comprise an encounter between two or more bodies, such as a near-collision situation or a "potential" crash. The bodies may comprise vehicles, bicycles, pedestrians, or stationary objects, as examples. A traffic conflict may comprise a trajectory of the bodies which will result in collision if the motion of one or more bodies does not change, such as by an evasive action (e.g., changing speed or direction). Its use may be accepted for highway safety diagnosis because it may not require extensive observation periods and may provide information into the failure mechanism leading to road collisions. Unlike traffic crashes, which are typically entered by a police officer in a crash database during the crash scene investigation, traffic conflict events are not currently reported or recorded.

The disclosed methods and systems may provide a practical procedure and/or algorithm to detect and quantify traffic conflict events by analyzing the relationship of trajectories of vehicles extracted from live or streaming traffic video. Few computational resources may be required, and these may be implemented to detect, classify, quantify, and log traffic conflicts in real time, resulting in a practical tool that may reveal potential deficiencies or opportunities, for which proactive engineering or non-engineering solutions may allow timely improvements.

The disclosed methods and systems may define conflict in a joint spatial-temporal domain (x, y, t) and compute a severity measure based on a surrogate velocity equivalent measure derived from trajectories revealed within a sliding tracking window ($\Delta t$). The spatially and temporally constrained space ($\Delta x$, $\Delta y$, $\Delta t$) that encloses the tracked trajectories may be referred to as a tracking prism. It may be based on actual spatial-temporal data extracted from live or steaming video. No specific assumptions may need to be made for driver behavior. Because of its simplicity, there may be minimal consumption of computing resources, and live images may be processed and analyzed in real time to simultaneously detect, classify, quantify, and log traffic conflict events for proactive road safety diagnosis and improvement specifically, characterization and representation of conflict events may be based on trajectories captured within a tracking prism, which may slide one frame at a time in synchronization with the live or streaming video. Conflict events may be detected based on a closeness measure of vehicles in conflict. The closeness measure may be defined in a joint spatial-temporal (x, y, t) domain. Tracking and detection may be improved by accounting for movement-specific features and/or right-of-way rules. Each movement may be assigned a unique identification (ID) number. The conflicts may be classified based on the approaching angles of vehicles and associated movement IDs. The severity of traffic conflict may be measured based on equivalent velocities of vehicles prior to the identified conflict points on the trajectories.

Methods may comprise receiving a live image as input from a traffic monitoring camera (such as those currently used by highway agencies) and processing the sequence of images by the disclosed video analytics methods and systems in real time. A video analytics method may comprise one or more of the following steps.

Step 1 may comprise obtaining the spatial and temporal position (x, y, t) of moving vehicles from a video source (e.g., a live camera, a network camera, a recorded video, etc.) over a defined tracking prism comprising an equivalent number of successive frames. Step 1 may comprise tracking the center points (x, y) of all moving objects and assigning a time stamp (t) relative to the tracking window. Step 2 may comprise transferring and plotting the center points (x, y) obtained in step 1 on a plan view, i.e., a top-down view, by geospatially referencing the two views (i.e., camera view and plan view). This may generate a corresponding sequence of dot-featured image frames on the plan view of the location being monitored. Step 3 may operate on the plan-view images obtained from step 2 and may extract trajectories of moving objects revealed in the tracking prism. Step 4 may comprise identifying conflicts. By inspecting trajectories manifested within the sliding tracking prism every time step, a true conflict may be detected based on closeness or separation of the trajectories in the joint spatial-temporal (x, y, t) domain. Step 5 may comprise characterizing and quantifying conflicts. Based on conflict points (defined as the points on conflicting trajectories, where the minimum separation may be measured from in the (x, y, t) domain, the approaching velocity (magnitude and direction) of each vehicle may be estimated based on the portion of trajectory prior to its conflict point. The angles of approaching velocities combined with their movement IDs may be used to characterize the type of conflict (e.g., northbound left turn vs. southbound through). The magnitude of difference in velocities of approaching vehicles, coupled with a probability function conditional upon the separation measure in the (x, y, t) domain, may be used to compute a conflict severity measure. These steps may be implemented iteratively by sliding the tracking prism one frame at a time in synchronization with live or streaming video sources.

The disclosed systems and methods may be implemented in a standalone application software or firmware, or packaged in an online service to which interested parties may subscribe using, e.g., a web hosting service (e.g. PythonAnywhere) or a cloud computing account (e.g., Amazon Web Services). The systems and methods may be implemented through a software or an online service protocol.

A live video analytics method may comprise one or more of the following steps. Step 1 may comprise obtaining the spatial-temporal positions (x, y, t) of vehicles. Points (x, y, t) representing vehicles from a video source (e.g., a live camera, a network camera, a recorded video, etc.) over a sliding tracking window (or an equivalent sequence of frames of images) may be obtained. The points representing vehicles may be obtained by tracking the center points (x, y) of moving vehicles and assigning a time stamp (t) relative to the starting point of the tracking window. The three-dimensional (x, y, t) space that encloses all potential points (x, y, t) may be referred to as a tracking prism.

Figure 1D:
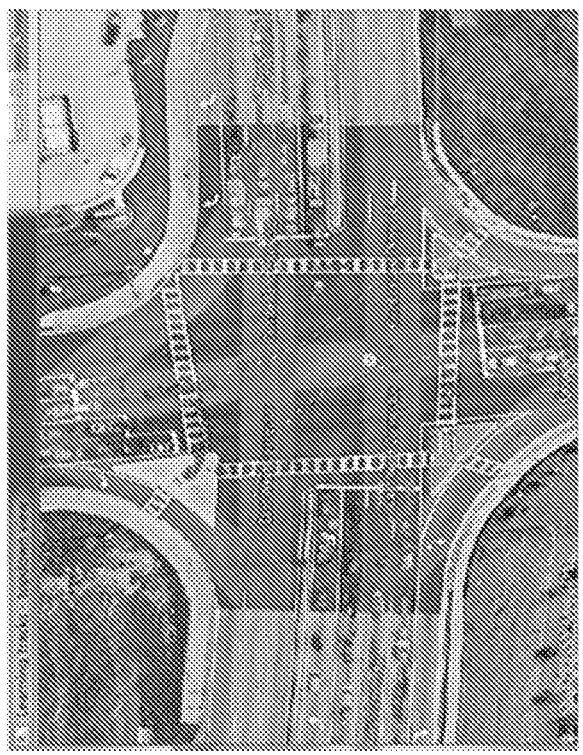

Step 2 may comprise representing the vehicle center points (x, y) in a plan (top-down) view. The corresponding center points (x, y) obtained in step 1 may be obtained on a plan view by geospatially referencing the two views, i.e., camera view and plan view, for each frame (t). This process may generate a corresponding sequence of dot-featured images on the plan view, as may be seen with reference to FIG. 1D.

This geospatial reference may be seen with reference to FIGS. 1A-1D. By referencing four corresponding points as specified by users, e.g., four vertices of the polygon shown in FIGS. 1A and 1B, the geospatial relationship of the two views, camera view and plan view, may be obtained. As a result, any points on the camera view may be geospatially referenced or "mapped" onto the plan view. As shown, the vehicles tracked in the camera view in FIG. 1C may be mapped in the plan view in FIG. 1D. A three-dimension camera model may also be used to convert the camera view to the plan view for improved accuracy.

Figure 2:
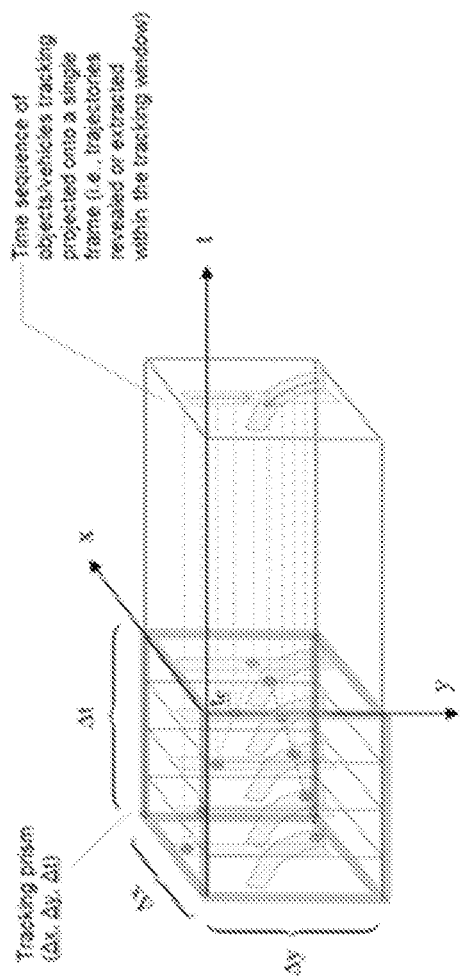
FIG. 2 shows an example identification of trajectories of moving vehicles.

Step 3 may comprise extracting trajectories of movements operating on the mapped plan-view images obtained in Step 2. The length of the image sequence, i.e., the number of successive frames, may define the temporal dimension (shown as $\Delta t$ in FIG. 2) of the tracking prism (the constrained volume of ($\Delta x$, $\Delta y$, $\Delta t$) defined by thicker lines in FIG. 2), which may slide one frame at a time in synchronization with the real-time video source. Given the centers of vehicles, represented as dots in FIG. 2, tracked in the spatial-temporal domain, the immediately past trajectories of vehicles captured within the sliding tracking prism may be identified and extracted. If the current time is $t_c$ as indicated in FIG. 2, the tracking prism may end at $t_c$. As time progresses, this prism may slide along with $t_c$. To extract the trajectories in this sliding prism, a simple heuristics, such as based on Intersection over Union (IoU) measure, or a density-based classification or cluster analysis (e.g., DBSCAN) may be employed in the joint spatial-temporal ($\Delta x$, $\Delta y$, $\Delta t$) domain. The aim may be to track each individual object or recognize trajectories as patterns of dots within the space of the tracking prism ($\Delta x$, $\Delta y$, $\Delta t$). To improve accuracy and robustness in extracting trajectories, a "track", represented by a polygon, may be defined for each distinct movement. For example, FIG. 2 shows two track polygons, i.e., one southbound through movement and one northbound left turn, assuming the north points up. Defining a confining track for each movement advantageously may allow classification or cluster analysis to be performed within each track polygon to improve the accuracy of distinguishing trajectories and to reduce computing time as well, and may allow assigning a movement identity to each trajectory so that the types of conflicts may be identified based on the identity assigned. For example, FIG. 2 shows a conflict between the permissive northbound left turn movement and the southbound through movement.

The dashed lines that connect the dots in FIG. 2 depicts the actual trajectories of the two vehicles (represented by two groups of dots) revealed within the tracking prism ($\Delta x$, $\Delta y$, $\Delta t$). The classification or cluster analysis (for extracting trajectories) may be performed in the joint spatial-temporal ($\Delta x$, $\Delta y$, $\Delta t$) domain. The temporal dimension ($\Delta t$) may be included in order to separate the dots that are close or "overlapping" in the spatial ($\Delta x$, $\Delta y$) domain, but that actually belong to different trajectories. For example, if two trajectories are crossing each other within the tracking window, the dots from two conflicting trajectories may be very close or overlap in the ($\Delta x$, $\Delta y$) domain. Inclusion of time dimension ($\Delta t$) may help to separate the dots of different trajectories in the "overlapping" area since those dots may have different time stamps. An actual collision, and not a conflict, may have occurred if the dots tracked in conflicting trajectories come really close in all three dimensions (x, y, t).

FIG. 2 shows identification of trajectories of moving vehicles within the tracking prism ($\Delta x$, $\Delta y$, $\Delta t$). As FIG. 2 shows, by jointly considering both spatial and temporal dimensions, a sequence of image frames (each image is two-dimensional in the spatial ($\Delta x$, $\Delta y$) domain) may be tracked over the temporal ($\Delta t$) dimension (i.e., with a time stamp assigned to each image frame with respect to the starting point ($t_c - \Delta t$) of the sliding tracking window), resulting in a rectangular tracking prism of size ($\Delta x$, $\Delta y$, $\Delta t$), illustrated by the thick lines in purple.

Step 4 may comprise identifying conflicts. Identifying conflicts may comprise inspecting trajectories in the prism ($\Delta x$, $\Delta y$, $\Delta t$) and quantifying a true conflict depending on their closeness or separation in the ($\Delta x$, $\Delta y$, $\Delta t$) domain. Each vehicle may have its physical dimensions and the centers of vehicles (dots) may be used to generate trajectories. Thus, the separation of any pair of trajectories in the ($\Delta x$, $\Delta y$, $\Delta t$) domain may not be less than a factual "minimum" value constrained by the physical dimensions of objects or vehicles. Otherwise, a collision may be implied since the objects or vehicles may actually be coming into contact, i.e., occupy nearly the same spot (x, y) at the same time (t).

As a substitute measure for collision, a conflict may be defined as any two conflicting trajectories in the spatial-temporal domain ($\Delta x$, $\Delta y$, $\Delta t$) that are less than a "maximum" separation threshold, but greater than a "minimum" separation that defined by the physical dimensions of vehicles. As such, a separation measure may be defined by Eq. (1) below for any pair of conflicting trajectories in the tracking prism ($\Delta x$, $\Delta y$, $\Delta t$) based on a "shortest" Euclidean distance.

$$d_{i,j} = \sqrt{(x_i-x_j)^2+(y_i-y_j)^2+(t_i-t_j)^2} \quad (1)$$

Given the two distinct dimension measures, i.e., space (x, y) and time (t), a scaling factor may be used, so Eq. (1) can be rewritten as:

$$d_{i,j} = \sqrt{\alpha[(x_i-x_j)^2+(y_i-y_j)^2]+(1-\alpha)(t_i-t_j)^2} \quad (2)$$

where, a is the scaling factor, $0 \le \alpha \le 1$.

Given a specific $\alpha$, the shortest separation may be found by minimizing Eq. (3) subject to all points being on the conflicting trajectories, for example, as follows:

$$\min_{x,y,t}[d_{i,j}^2] = \min_{x,y,t}\{\alpha[(x_i-x_j)^2+(y_i-y_j)^2]+(1-\alpha)(t_i-t_j)^2\} \quad (3)$$

Subject to: $(x_i, y_i, t_i) \in$ trajectory i and $(x_j, y_j, t_j) \in$ trajectory j Varying $\alpha$ from 0 to 1 may produce a Pareto frontier. Practically, a may be a weighting factor, which may indicate the importance of spatial closeness versus the importance of temporal closeness. The higher the $\alpha$ value, the more important the spatial closeness may be. A lower a value may give more weight or importance to the temporal closeness. Two boundary conditions may be (1) $\alpha=0$, which may indicate only time separation is considered in defining a conflict and (2) $\alpha=1$, which may indicate only spatial separation is considered in defining a conflict.

Figure 3A:
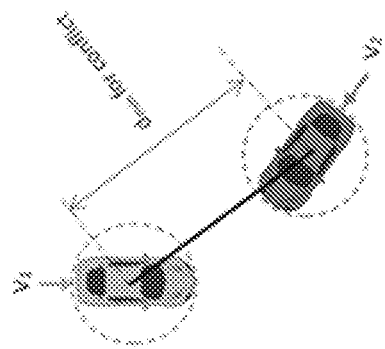
FIGS. 3A-3D show example minimum distances for collision and conflicts.

Based on the definition above, a minimum separation of two conflicting trajectories less than a "maximum" threshold may imply that the two subject vehicles are moving close enough, both spatially and temporally, to be considered as a conflict. In this case, the point on each trajectory where the minimum distance was measured may be defined as "conflict points." Based on this definition, there may be two conflict points, one on each trajectory of two conflicting vehicles. Because points on trajectories may represent the centers of vehicles, the physical vehicle dimensions may be considered in defining the "maximum" threshold for this minimum separation. When the two conflict points are close enough to reach the limit of physical dimensions of two conflicting vehicles, it may indicate a collision or crash as seen in FIG. 3A which may be considered as a special or extreme case of conflict. Typical scenarios of conflict are illustrated in FIGS. 3B, 3C, and 3D, depending on the velocities of approaching vehicles, who has the right of way, and whether they were braking or not prior to the conflict points.

Figure 3B:
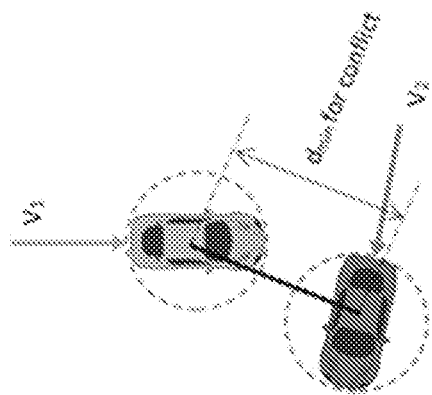
Figure 3C:
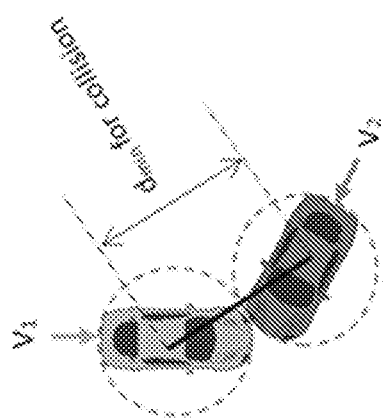
Figure 3D:
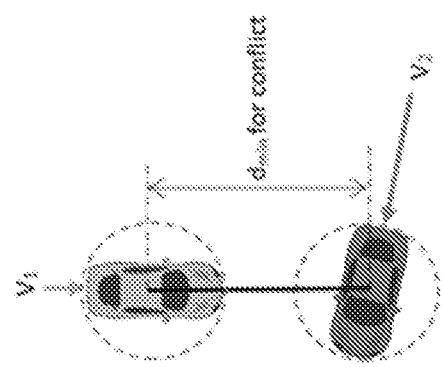

FIGS. 3A-D show examples of minimum distance for collision and conflicts. The example of FIG. 3A illustrates a minimum separation $d_{min}$ for a collision, which may be defined as vehicles making physical contact. The example of FIG. 3B illustrates vehicles $V_1$ and $V_2$ that may have each slowed down (braked) to avoid a potential collision. Illustrated in FIG. 3B is an example minimum separation $d_{min}$ for a non-collision conflict event. In FIG. 3C, vehicle $V_2$ may have been travelling at a higher speed, and vehicle $V_1$ may have slowed down (braked) to avoid a potential collision. In the scenario of FIG. 3C, vehicle $V_1$ may have had a higher priority right of way but still slowed down to yield to vehicle $V_2$ that had a lower priority right of way. In the example scenario of FIG. 3D, both vehicle $V_1$ and vehicle $V_2$ may have relatively high speeds. In the scenario of FIG. 3D, vehicle $V_2$ may have passed the conflict area, and vehicle $V_1$ may be about to pass the conflict area immediately after vehicle $V_2$. This type of scenario represents a near-miss conflict.

In FIG. 3D, $V_1$ may be the vehicle that has the higher right-of-way priority; $V_2$ may be the vehicle that has the lower right-of-way priority; $d_{min}$ is the minimum separation in x, y, t domain that may be calculated per Eq. (3); and the arrow indicates the velocity of vehicles, where a longer arrow indicates a higher speed.

Step 5 may comprise characterizing and quantifying traffic conflicts. As defined previously, the conflict points may be the points on conflicting trajectories, where the minimum separation ($d_{min}$) may be measured in the ($\Delta x$, $\Delta y$, $\Delta t$) domain. Once a conflict point is identified for a trajectory, the approaching velocity (magnitude and direction) of each vehicle may be estimated based on the portion of trajectory prior to this conflict point. Then, the relative velocity (difference in velocity) of two conflicting vehicles prior to their respective conflicting points may be determined. This relative velocity indicates how severe a collision would be if it had happened; as such, relative velocity may be used to assess the severity of a conflict based on its potential consequence implied from relative velocity.

Figure 4A:
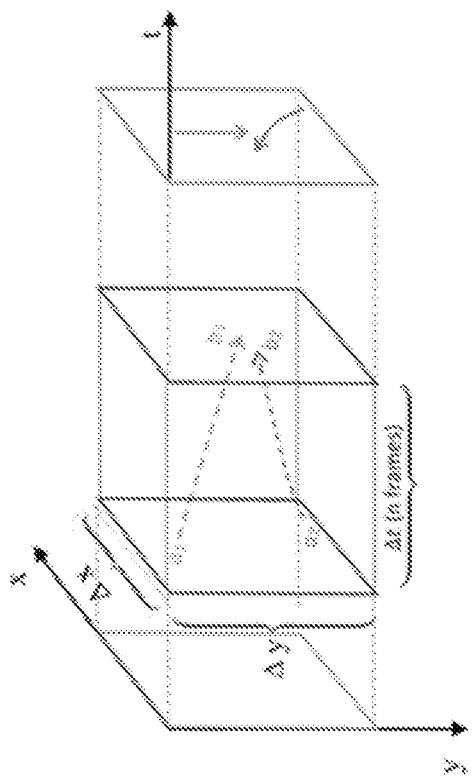
FIGS. 4A-4D show example relative velocity determination with trajectories.
Figure 4D:
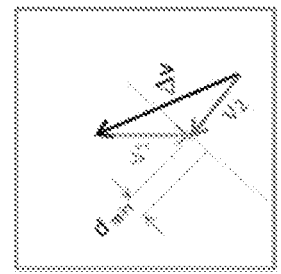
Figure 4C:
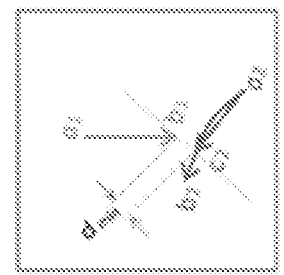
Figure 4B:
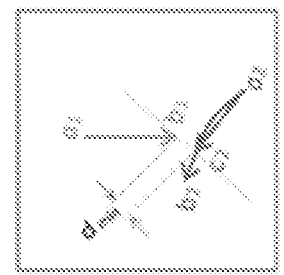

FIGS. 4A-4D show an example process for determining relative velocity. This process may be continued as the tracking prism slides along the temporal dimension in real time in synchronization with a video source, for example, as shown in FIG. 4A In FIG. 4A, the frame shows the projection of two trajectories in the tracking prism (trajectory 1: $a_1 \to b_1$; trajectory 2: $a_2 \to b_2$) to the spatial (x, y) domain. FIG. 4B shows $d_{min}$, which was calculated to be between the point $b_1$ on trajectory 1 and the point $c_2$ on trajectory 2. Points, i.e., $b_1$ and $c_2$ in this example may be referred to as conflict points. The distance may be the shortest in (x, y, t) domain but not necessarily the shortest in (x, y) domain. In FIG. 4C, the portion of trajectories before the conflict points, i.e., $b_1$ and $c_2$, may be used to compute a velocity measure for each vehicle. The velocity measure may be defined as a vector by connecting the beginning point and the conflict point of each trajectory. The "velocity measure" used here may be in unit of distance over the defined tracking time window $\Delta t$, which may be constant for all trajectories. The velocity measure defined as such may be a surrogate measure of true velocity. For example, the velocity measure for trajectory 1 may be shown as vector $a_1 \to b_1$ and the velocity measure for trajectory 2 is shown as vector $a_2 \to c_2$. In the illustration of FIG. 4D, one of the velocity measures may be moved in parallel along the line (where the $d_{min}$ was measured) until the two $d_{min}$ points overlap. A difference in velocity ($\Delta v$) may be obtained via vector subtraction. The magnitude of $\Delta v$ and the angle between the two velocity measures may be used to determine conflict type and severity.

FIG. 5A references FIGS. 4A-4D and shows the progression of the trajectories from FIGS. 4A-4D as the tracking prism slides along the time (t) axis. The original prism is shown in gray; the new prism (after sliding) is shown in purple. The original trajectories ($a_1 \to b_1$; $a_2 \to b_2$) in FIGS. 4A-4D become $a_1' \to b_1'$ and $a_2' \to b_2'$, which can be seen in FIG. 5B. FIG. 5C illustrates a scenario where, although the two trajectory lines intersect, the shortest distance may not be zero because the time dimension (t) may also be used to define the "distance." FIG. 5D illustrates a scenario where velocities ($v_1$ and $v_2$) before the $d_{min}$ are obtained by connecting the starting point of each respective trajectory to the points for measuring $d_{min}$, i.e., conflict points. In FIG. 5E, the velocity vector difference, $\Delta v$, before the conflict points is shown. Its magnitude and direction may be derived from vector subtraction. Given the angle between v1 and v2, $\Theta$, the magnitude of $\Delta v$ may be calculated according to the following formula:

$$|\Delta v| = \sqrt{|v_1|^2 + |v_2|^2 - 2|v_1||v_2|\cos(\theta)} \quad (4)$$

FIGS. 5A-5E show the minimum separation tracked by a sliding prism of size ($\Delta x$, $\Delta y$, $\Delta t$). It shows the progression of the trajectories in FIGS. 4A-4D as the tracking prism slides along the time dimension, which may result in a smaller minimum separation ($d_{min}$). The process of finding conflict points based on minimum separation, estimating equivalent velocity measures prior to the conflict point for each trajectory, and calculating relative velocity, may be carried out in real time as the tracking prism slides one frame at a time in synchronization with live or streaming video sources.

Conflict events may be identified based on the minimum separation ($d_{min}$) defined in the (x, y, t) domain. Given the tracking prism at any time t, a unique $d_{min}$ may be computed and used for conflict identification. As the prism slides, $d_{min}$ may change. As FIGS. 5A-5E show, a conflict occurrence was first recorded in FIGS. 4A-4D. However, as the prism slides, a smaller separation ($d_{min}$) may result for the same conflict event. In that case, the smaller $d_{min}$ may be retained. For a particular conflict event, the smallest $d_{min}$ and the corresponding conflict points may be recorded and used for evaluating the conflict event.

Figure 6:
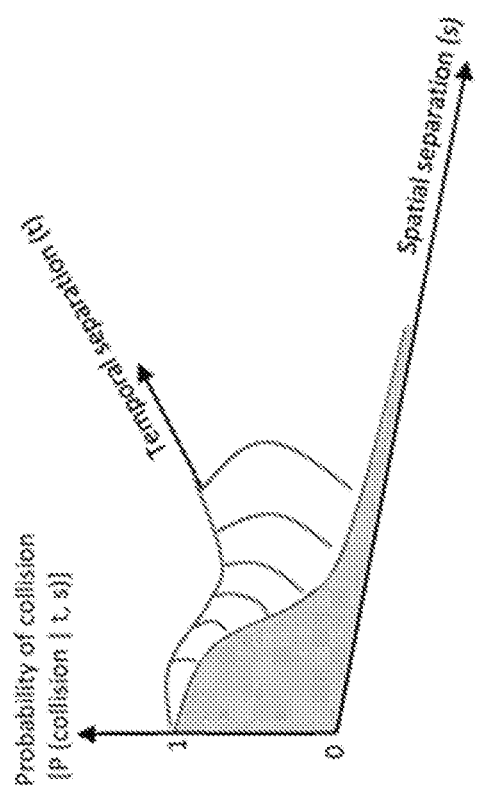
FIG. 6 shows an example collision probability.

The conflict severity may be quantified by considering the probability of a collision conditional upon the minimum separation of conflicting trajectories in the joint spatial and temporal domain. Thus, the probability of a collision may be a function of spatial (s) separation and temporal (t) separation as FIG. 6 shows.

The smaller the separation (both temporal and spatial) is, the higher the probability of collision (PTC) may be. As the separation become larger, the probability of collision may decrease. To simplify computation, the temporal and spatial dimensions may be combined and may be replaced with minimum separation ($d_{min}$) defined in Eq. 3. As such, two boundary conditions may exist: (1) If the minimum separation ($d_{min}$) is equal to or less than the value limited by the physical dimensions of vehicles (as FIG. 3A shows), a collision has occurred, implying the probability of collision is equal to 1.0, (2) As the minimum separation ($d_{min}$) becomes large enough, the probability of collision approaches zero.

By using the minimum separation ($d_{min}$) defined in Eq. 3, the boundary conditions may be written as follows:
(a) $P(\text{collision}|d_{min}) = 1$, when $d_{min} = 0$
(b) $P(\text{collision}|d_{min}) = 0$, when $d_{min} \leq d_{safe}$ Condition (a) may indicate that the collision has occurred when the minimum separation is zero, implying the physical contact of objects or vehicles. Condition (b) may indicate that the collision is impossible when the minimum separation is larger than a separation threshold value that is considered safe, $d_{safe}$.

To determine a proper value for $d_{safe}$, field observational studies may be used. But the commonly used values for perception reaction time ($t_r$) may be referenced. Two values of $t_r$ may have been adopted in practice. $t_r = 1.0$ second may be used for timing the yellow change of traffic signals and $t_r = 2.5$ seconds may be used for computing safe stopping distances for highway geometric design [AASHTO 2011]. The shorter $t_r = 1.0$ may be due to the fact that driver response to the yellow indication may be an expected condition. Those $t_r$ values together with a selected speed (e.g., design speed, posted speed, or operating speed) may be used to derive a proper value for safe separation, $d_{safe}$. Note that spatial separation and temporal separation may be exchangeable. The spatial separation may be determined by multiplying temporal separation and speed. It should be pointed out that safe separation may be contextual, may vary depending on crash types, and may be determined based on application contexts.

By considering the two boundary conditions, described previously, some specific functional forms may be used for computing the collision probability depicted in FIG. 6. The simplest form may be a linear function and can be expressed in Eq. 5.

$$P(\text{collision} | d_{min}) = 1 - \frac{d_{min}}{d_{safe}} \quad (5)$$

Note that collision risk may decrease dramatically within the range of smaller separations, the following expression (Eq. 6) may be adopted:

$$P(\text{collision} | d_{min}) = \frac{2}{1 + e^{c\left(\frac{d_{min}}{d_{safe}}\right)}} \quad (6)$$

where c is a parameter that may determine how fast the probability of collision decreases as $d_{min}$ increases.

Figure 7:
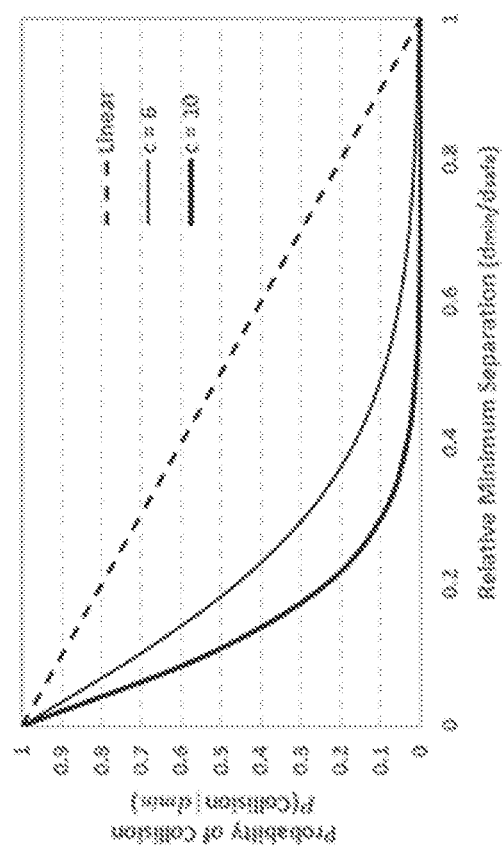
FIG. 7 shows example functional forms for computing collision probability.

For illustration, the linear function (Eq. 5) and non-linear function (Eq. 6) with different parameters (c=6 and c=10) are plotted in FIG. 7.

The two expressions (Eqs. 5 and 6) are shown as examples to illustrate the concept. Other function forms may be selected if they satisfy (strictly or loosely) the two boundary conditions described above. Once the method is implemented and adequate conflict data are acquired, the collision probability functions (e.g., Eqs. 5 and 6) may be calibrated using acquired conflict data.

Because the disclosed methods and systems identify and quantify traffic conflicts, the size of the sliding window, $\Delta t$, may be selected to accommodate two competing objectives: (1) $\Delta t$ may be large enough to cover nearly "all" potential conflicts, i.e., probability of a conflict >0; and (2) $\Delta t$ may be small enough to reduce computational cost and render real-time application.

Given the probability of collision, conditional upon temporal-spatial separation and velocity difference, the severity of a conflict may be computed as shown in Eq. 7 below:

$$\text{Conflict Severity} = P(\text{collision} | t, s) \cdot |\Delta v| \quad (7)$$

where, $|\Delta v| = \sqrt{|v_1|^2 + |v_2|^2 - 2|v_1||v_2|\cos(\theta)}$

Figure 8:
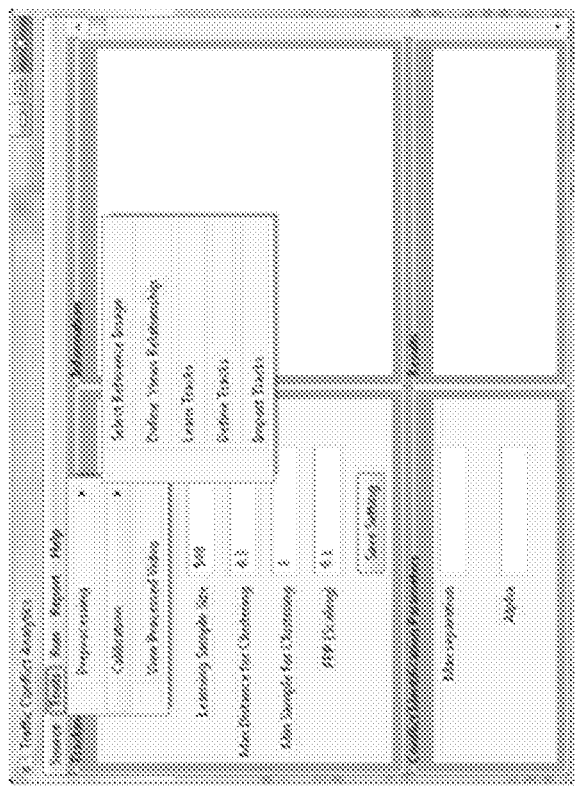
FIG. 8 shows an example screenshot of a computer implementing methods to continuously process and analyze images from a traffic monitoring video.

A computer program that implements at least some of the disclosed methods has may continuously process and analyze sequential images from a traffic monitoring camera, which has typically been used by highway agencies for monitoring traffic at intersections or along roadway sections. FIG. 8 shows a sample screenshot for such a program.

The procedure to calibrate a probability-of-collision function may be as follows. The procedure may comprise continuously logging or recording separation ($d_{min}$) for specific collisions (e.g., northbound left turn movement and southbound through movement) for a specified period of observation. The procedure may comprise obtaining frequency and distribution of separations ($d_{min}$) logged over the period of observation. The procedure may comprise using the frequency and distribution of $d_{min}$ to calibrate the probability-of-collision function based on Eq. 8.

$$P(\text{collision} | d_{min} = s) = \frac{P(d_{min} = 0)}{P(d_{min} = s)} = \frac{\text{Freqency of } d_{min} = 0 (\text{i.e., Freqency of colision})}{\text{Frequency of } d_{min} = s} \quad (8)$$

where P indicates probability function, s indicates a particular value of separation ($d_{min}$). A hypothetical example illustrating the calibration procedure is detailed in Table 1.

TABLE 1

| Separation (s, in second) | Observed Frequency | Relative Frequency | P(collision\|dmin) = 0 (Frequency of dmin = 0/ Frequency of dmin = s) |
|---|---|---|---|
| 0.00 | 2 | 0.00040 | 1.00000 |
| 0.10 | 6 | 0.00121 | 0.33333 |
| 0.20 | 10 | 0.00201 | 0.20000 |
| 0.30 | 50 | 0.01060 | 0.04000 |
| 0.40 | 100 | 0.02013 | 0.02000 |
| 0.50 | 200 | 0.04026 | 0.01000 |
| 0.60 | 300 | 0.06039 | 0.00667 |
| 0.70 | 500 | 0.10064 | 0.00400 |
| 0.80 | 800 | 0.16103 | 0.00250 |
| 0.90 | 1000 | 0.20129 | 0.00200 |
| 1.00 | 2000 | 0.40258 | 0.00100 |

Total: 4968

The triangle markers (on the solid line) indicate the probability of collision estimated from conflict frequency data. They may be used to calibrate the probability function (e.g., Eq. 6) by curve-fitting techniques.

The probability of collision may be related to the separation measure defined in (x,y,t) domain. Collision is just a special case of conflict when the separation decreases to zero. In a collision scenario, a conflict may always be registered first prior to the collision when the two conflicting vehicles (objects) approach each other close enough (i.e., $d_{min} < d_{safe}$). If the separation continues to decrease until the conflicting vehicles eventually come into contact (i.e., $d_{min}=0$), a collision may occur.

Because of the temporal dependency of conflict and collision, the probability of collision conditional upon a separation ($0 < d_{min} < d_{safe}$) may be estimated by Eq. 8. Based on Eq. 8, the probability of collision conditional upon $d_{min}=s$ may be interpreted as the proportion of conflict events with a separation of $d_{min}=s$ that eventually led to a de facto collision. The calibration may be conducted regularly to capture any changes in drivers' behavior and technologies.

FIGS. 9A-9D show two tracking methods. In one method of tracking within regions of interest (ROIs), multiple ROIs may be defined (four in this example) and trajectories may be extracted within each ROI (FIGS. 9A-9B). FIG. 9A illustrates vehicle tracking in the camera view. FIG. 9B illustrates trajectories within ROIs in the plan view. FIGS. 9C-9D show an alternate method wherein ROIs may be tracked by movements (track polygons). Track polygons may be defined, and trajectories may be extracted within each track polygon. Each movement may be represented by a track polygon identity. This may allow the type of conflict to be identified and geographically located. In FIG. 9C, vehicle tracking in the camera view is illustrated. In FIG. 9D, trajectories within track polygons in plan view are illustrated.

To test the algorithm, some conflict events may be simulated. The simulation video may be processed by the proposed algorithm. Some characteristic images (FIG. 10A-10E) may be extracted sequentially from the video. It is demonstrated how the algorithm may be capable of successfully detecting a conflict. To understand the scenario described below, the reader should be reminded that the trajectories shown on the aerial view images (to the right) may be lagging with respect to the vehicle positions shown on the left. For discussion of FIG. 10A-10E below, we refer "North" as pointing up.

Figure 10A:
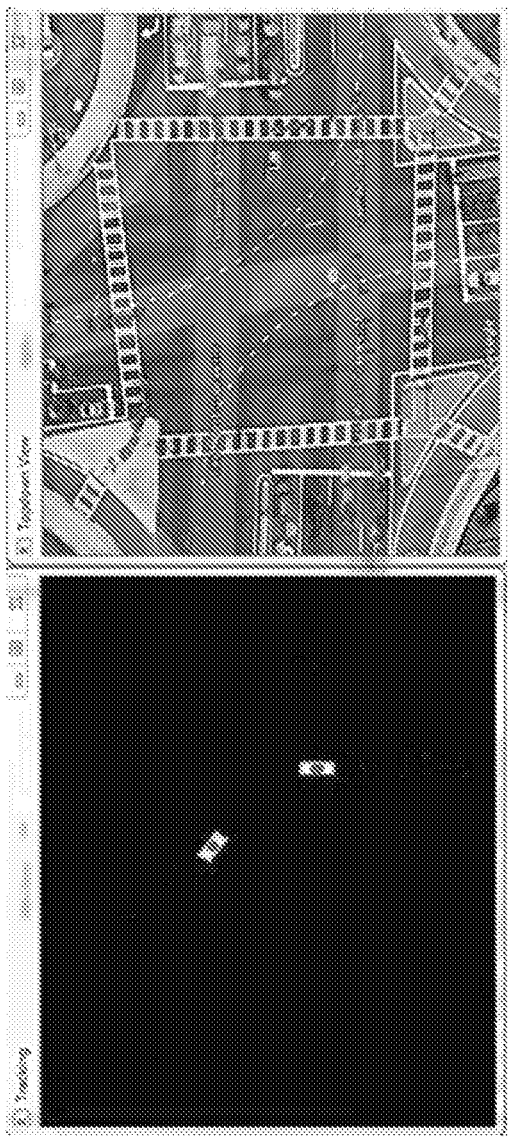
FIGS. 10A-10E show an example screen capture of a site administrator interface.

FIG. 10A shows a southbound left-turning vehicle (yellow) and a northbound through-vehicle (white) approaching each other. The two lines (on the right) show the trajectories of the two vehicles.

Figure 10B:
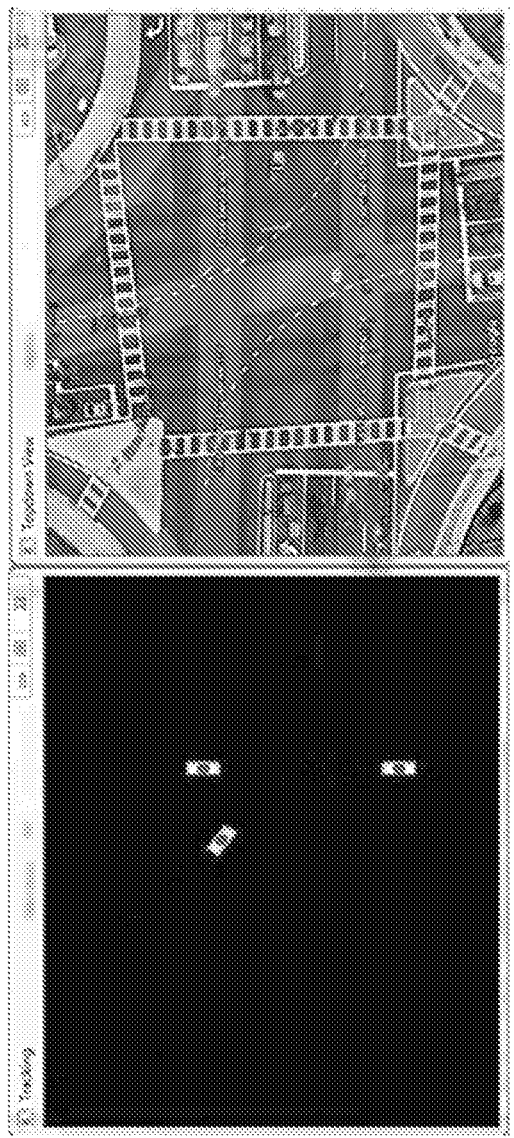

FIG. 10B shows the southbound left-turning vehicle decelerating to yield to the opposing northbound through vehicle. The deceleration may be discerned as the shorter trajectory line as compared to the longer trajectory line in FIG. 10A. It should also be noted that a second northbound through vehicle shows up.

Figure 10C:
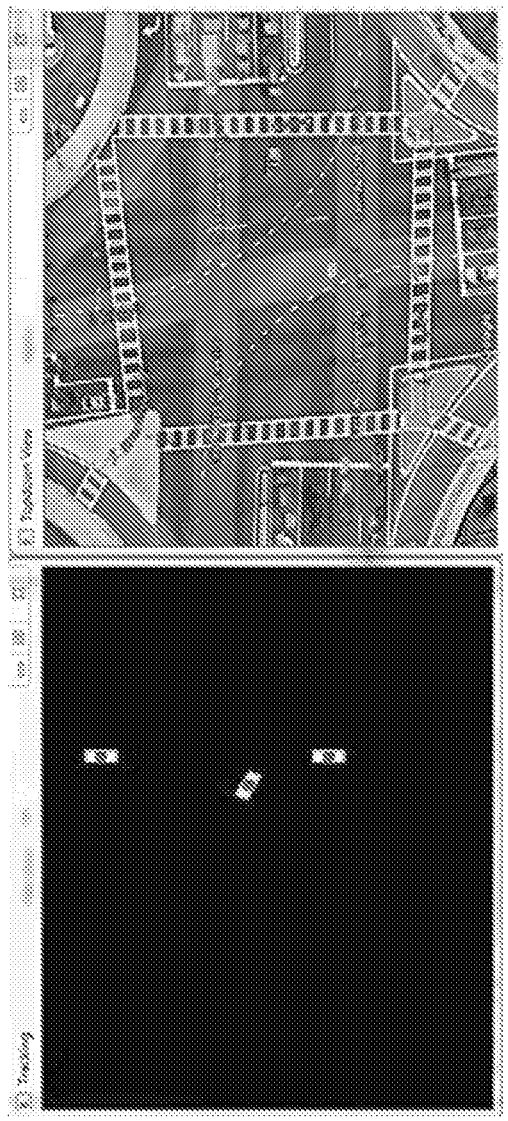

In FIG. 10C, the northbound left-turning vehicle continues to turn without yielding to the second approaching northbound through vehicle.

Figure 10D:
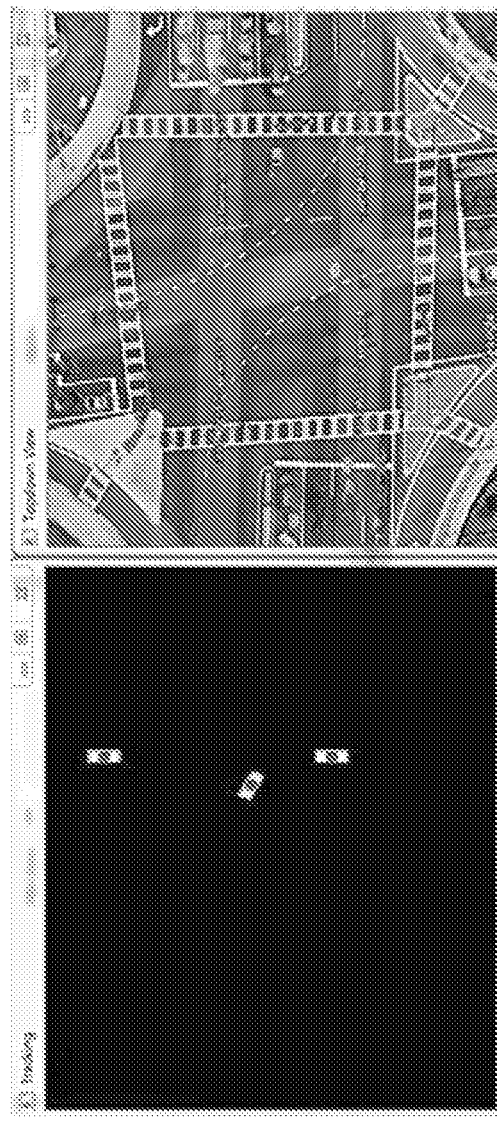

In FIG. 10D, the left-turning vehicle passed in front of the second northbound through vehicle. The longer line on the top is the remaining trajectories (lagging) of the first northbound through vehicle, which has left the scene.

Figure 10E:
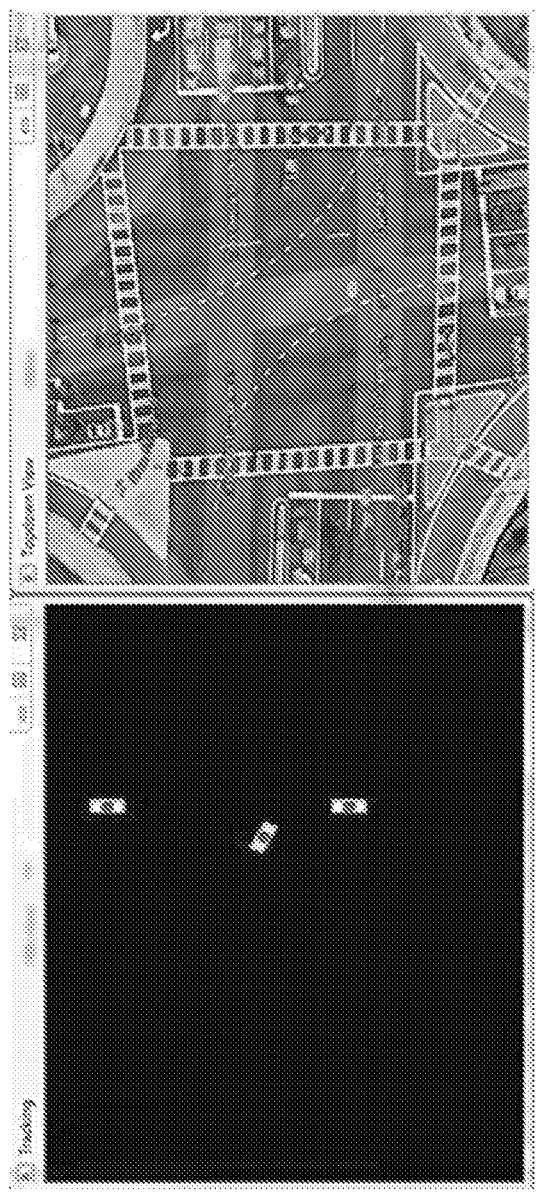

Referring to FIG. 10E, the second through vehicle continues traveling northbound; the left-turning vehicle completed its southbound turn and now is traveling eastbound. Because of the lagging nature of the trajectories, a near miss conflict was subsequently detected (as seen by the two arrows in pink on the right side). The longer arrow associated with the southbound left-turning vehicle may indicate a faster speed of the left-turning vehicle as compared to the shorter arrow for the second northbound through vehicle, which may indicate a slow-down to avoid the potential collision.

The conflicts may be characterized based on the following attributes for logging and storing purposes. The data packet transmitted for each conflict event may have those attributes.
  intersection: indicates the monitoring location, where the conflict is detected.
  time: the time when the conflict occurs
  c_type: one of the conflict types illustrated FIG. 3A-3D
  s1: the speed prior to the conflict point for conflicting vehicle 1
  a1: the angle that vehicle 1 approaches the conflict point on its trajectory (the angle is defined in the range of 0-360 degree by referencing a starting point. e.g. 0 degree as being pointing down).
  s2: the speed prior to the conflict point for conflicting vehicle 2
  a2: the angle that vehicle 2 approaches the conflict point on its trajectory.
  st1_x: x coordinate of the starting point on the captured trajectory of vehicle 1
  st1_y: y coordinate of the starting point on the captured trajectory of vehicle 1
  cp1_x: x coordinate of the conflict point on the captured trajectory of vehicle 1
  cp1_y: y coordinate of the conflict point on the captured trajectory of vehicle 1
  st2_x: x coordinate of the starting point on the captured trajectory of vehicle 2
  st2': y coordinate of the starting point on the captured trajectory of vehicle 2
  cp2_x: x coordinate of the conflict point on the captured trajectory of vehicle 2
  cp2_j: y coordinate of the conflict point on the captured trajectory of vehicle 2
  min_dist: minimum distance between the two conflict points on the two trajectories (computed by Eq. 3 and illustrated in FIG. 3).
  delta_v: velocity difference of the two conflicting vehicle approaching to their conflict points (Eq. 6).
  P: probability of collision, indicated in FIG. 6, and FIG. 7, can be computed per Eq. 4 and Eq. 5.
  severity: the severity of conflict defined in Eq. 4.

Figure 11:
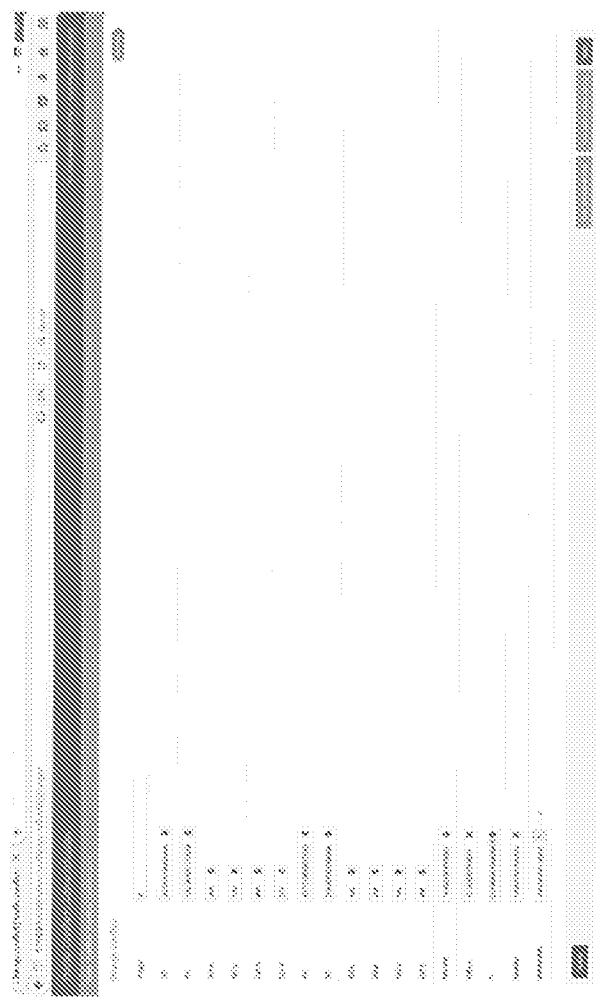
FIG. 11 shows an example screen capture of a database interface with multiple conflict events.

FIG. 11 shows a screen capture of a site administrator interface, which shows a specific conflict and related attributes being logged by a server, such as c_type, s1, a1, s2, and a1.

Figure 12:
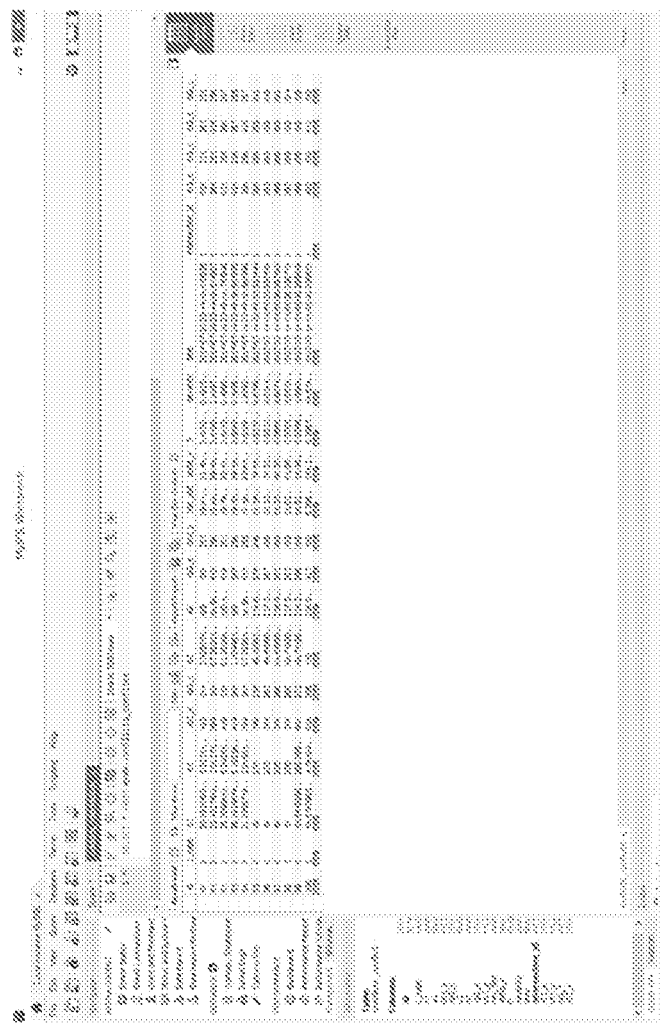
FIG. 12 shows an example screen capture of a database interface with multiple conflict events.

FIG. 12 shows a screen capture of a database interface comprising multiple conflict events that are being or have been recorded. The columns of the database interface comprise values associated with the attributes of the conflicts.

Figure 15:
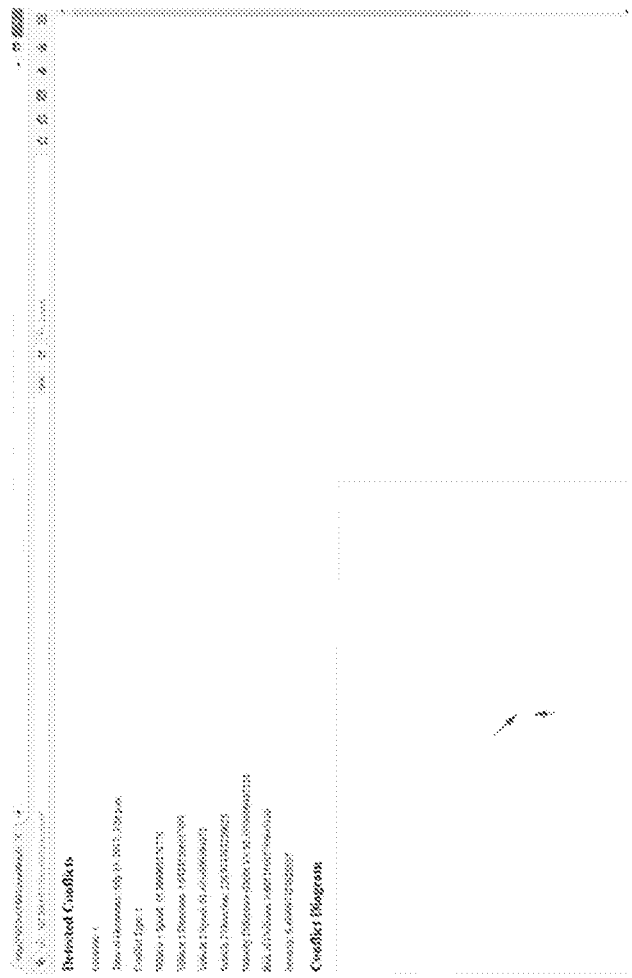
FIG. 15 shows an example screen capture of a database interface with multiple conflict events.

FIG. 15 shows a screen capture of an interface comprising an indication of detected conflicts and a conflict diagram.

Figure 13:
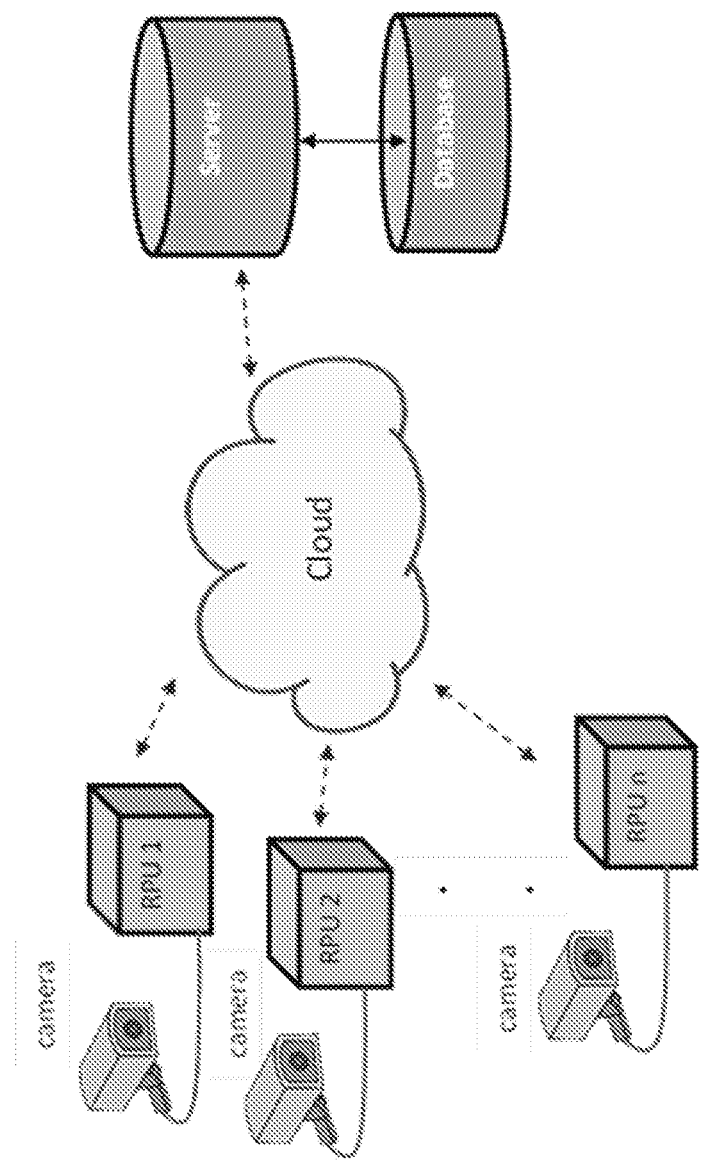
FIG. 13 shows an example schematic of a distributed system.
Figure 14:
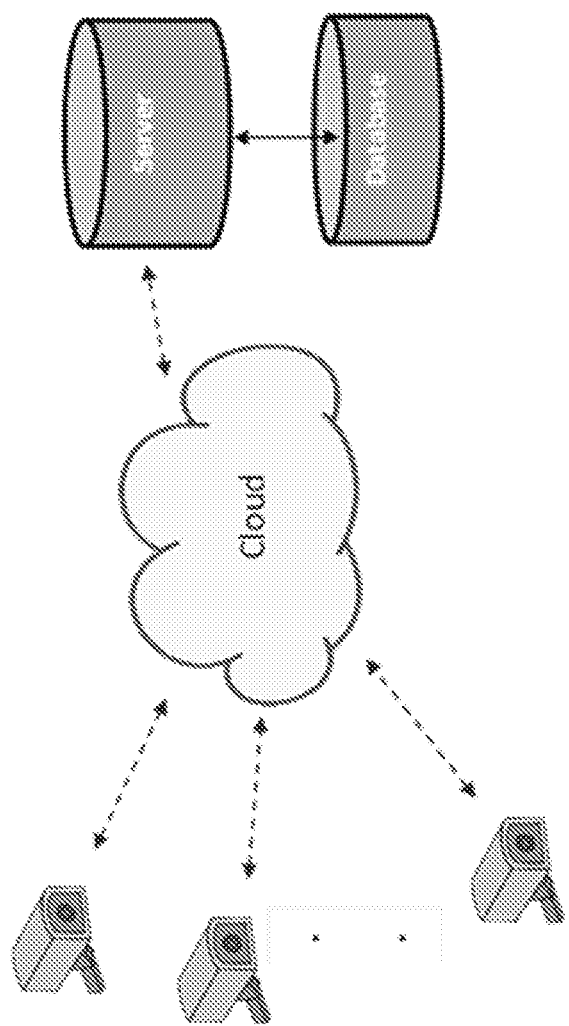
FIG. 14 shows an example schematic of a distributed system

As shown in FIG. 13 and FIG. 14, deployment of the system may be accomplished in one of the two ways: a distributed system, or a centralized system. As shown in FIG. 13, for the distributed system, a road processing unit ("RPU") may be required to process live video locally at each site being monitored. The processing unit may perform functions, including video processing, detecting, and classifying and quantifying conflict events in real time. Once a conflict is detected, the conflict characteristic data may be transmitted via Cloud to a server, which may be located in a traffic management center. The server may keep logging all conflicts received from all the sites being monitored and store those conflict data in a database. A database server may be required to perform data analytics on the conflict data accumulated in the database. A schematic of a distributed system is shown in FIG. 13. Since the amount of data transmitted over the Cloud may be small (i.e., only compiled conflict characteristic data is transmitted), not much network bandwidth may be required.

For the centralized system, the road processing units may be eliminated and the video from field cameras (e.g., internet protocol or IP cameras) may be streamed via Cloud to Server directly, and all video processing and analytics may be carried out on the server in the management center. A schematic of the centralized system is shown in FIG. 14. Since all video data may be transmitted (streamed) over the Cloud, the network bandwidth for data transmission may need to be large enough for real-time application.

The disclosed systems and methods may be free from environmental constraints, permitting multiple vehicles to be included in the range of real-time video, thus providing a reliable and early warning. The systems and methods may be easy to implement, highly accurate, suitable for real-time traffic safety warning for any highway or motorway, and thus may have broad application. The systems and methods may provide practical and readily implementable detection and quantitation of traffic conflicts in real time, permitting roadway safety to be monitored and assessed in real time using live or streaming traffic video, e.g., traffic cameras. The systems and methods may proactively permit corrective actions and/or improvements to be timely deployed resulting in a safer road environment for the travelling public. This may benefit public agencies, private entities responsible for operating and maintaining roadway systems, autonomous vehicle/self-driving car technologies that can use the systems and methods to evaluate safety in both pilot and deployment stages, law enforcement agencies, etc.

Figure 16:
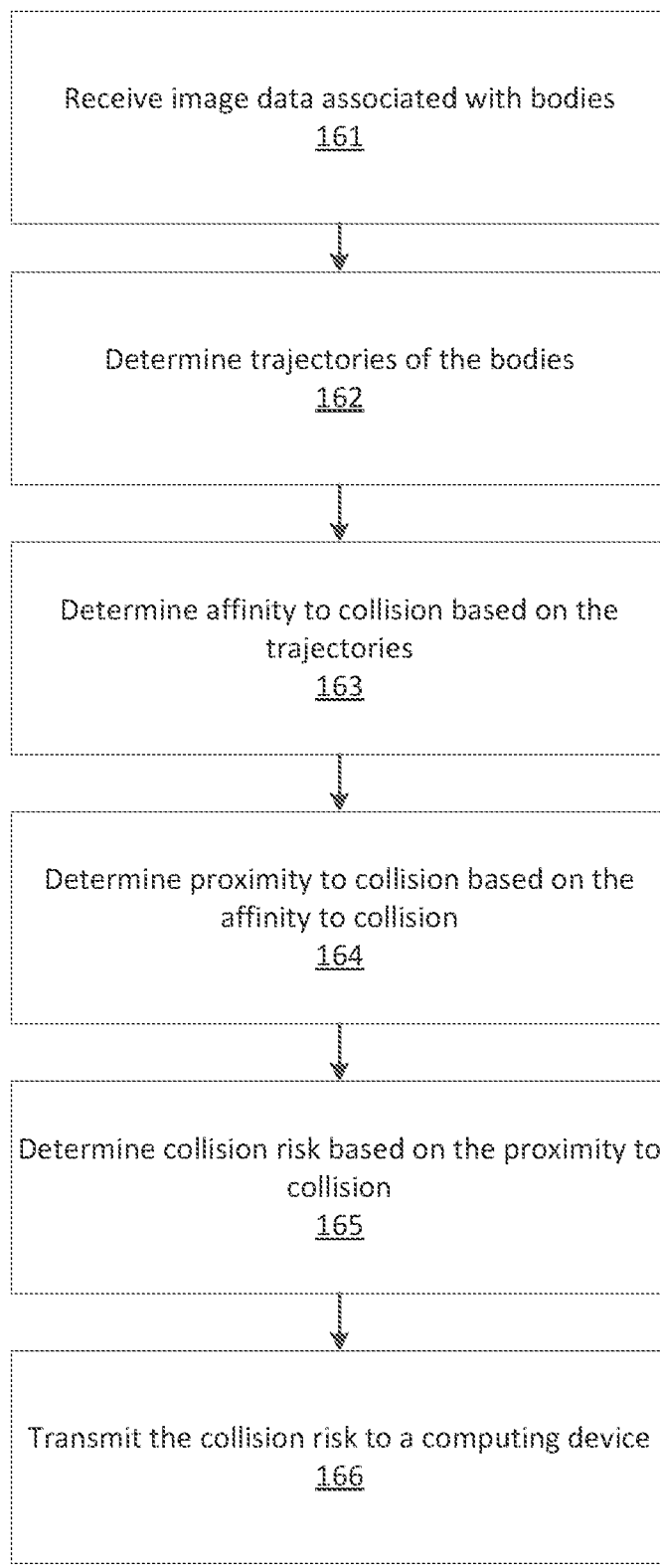
FIG. 16 shows an example method.

Collision risk may comprise the probability that a collision will occur between bodies if the bodies continue along their spatial-temporal trajectories. FIG. 16 shows an example method for quantitatively assessing a traffic collision risk between bodies. At step 161, image data associated with the bodies may be received. The image data may comprise live image data or previously-recorded image data, as examples. The image data may comprise a plurality of still images of the bodies. The image data may comprise video of the bodies. The image data may be generated by a camera device, such as a traffic monitoring camera or a camera on a traffic control device.

At step 162, trajectories of the bodies may be determined. The trajectories of the bodies may be determined using a method similar to the method disclosed for generating the trajectories in FIGS. 2 and 4a using the image data in FIGS. 1A-1D. For example, trajectories modeling the motion of the bodies may be generated based on the image data. The trajectories may be modeled by a prism in a time window, such as the sliding time window 1700 shown in FIG. 17. The time window may comprise a plurality of frames or located or moving along an axis representing time. The spatial representation of the bodies may comprise points or vectors within a prism 1701 located or moving along the axis (t) representing time. The prism may comprise dimensions ($\Delta x$, $\Delta y$, $\Delta t$). The frames or prisms may comprise indications of the locations of the bodies at the associated time. The prism may slide along the (t) axis. As the prism slides along the (t) axis, the points or vectors may render at locations associated with the ($\Delta x$, $\Delta y$) at the time associated with the position on the (t) axis. The points or vectors representing the spatial motion of the bodies may be projected onto a tracking prism 1702 as trajectories.

Based on the trajectories, a minimum distance between the bodies may be determined. For example, the minimum distance $d_{i,j}$ may be determined using Eq. 9.

$$d_{i,j} = \sqrt{\min_{x,y,t}\{\omega[(x_i - x_j)^2 + (y_i - y_j)^2] + (1 - \omega)(t_i - t_j)^2\}} \tag{9}$$

subject to: $(x_i, y_i, t_i) \in$ trajectory i and $(x_j, y_j, t_j) \in$ trajectory j where, $\omega$ is a weighting factor between spatial separation and temporal separation, $(x_i, y_i, t_i)$ and $(x_j, y_j, t_j)$ are points on the trajectories of the bodies.

Example conflict points 1703 and 1704 on the trajectories represent where the bodies were within the minimum separation distance.

Figure 18:
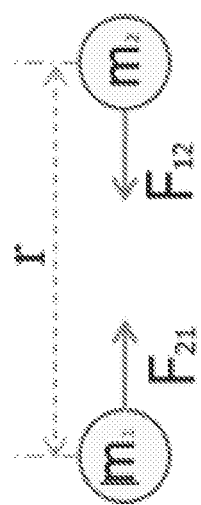
FIG. 18 shows an illustration of Newton's law of gravitation.

At step 163, an affinity to collision of the bodies may be determined based on the trajectories. The affinity to collision may be determined based on Newton's law of gravitation. FIG. 18 illustrates Newton's law of gravitation. According to Newton's law of gravitation, two bodies with mass $m_1$ and $m_2$ attract each other by a force that is directly proportional to the product of their masses and inversely proportional to the square of the distance between their centers. Newton's law of gravitation can be mathematically expressed by Eq. 10.

$$F_{12} = F_{21} = G\frac{m_1 m_2}{r^2} \tag{10}$$

where $m_1$, $m_2$ = masses of two particles
r = distance between the centers of the two particles
G is gravitational constant.

The affinity to collision may be directly proportional to the product of the approaching speeds of the bodies. The affinity to collision may be inversely proportional to a power function of a distance or separation measure of the bodies. The approaching speeds and separation of the bodies may be determined based on the trajectories, such as within an interval where $\Delta t$ is small. $\Delta t$ may be considered small when $\Delta t$ is less than 1 second, less than 2 seconds, or another time. The affinity to collision (ATC) may be determined using Eq. 11, the conflict gravity model.

$$ATC = \alpha \frac{V_1 \cdot V_2}{d^\beta} \tag{11}$$

where, $V_1$ = approaching speed of object 1 (e.g., vehicle 1)
$V_2$ = approaching speed of object 2 (e.g., vehicle 2)
d = minimum separation defined in Eq. 2 ($d_{i_c,j_c}$, note the subscripts $i_c,j_c$ were dropped for succinctness).
$\alpha$, $\beta$ = positive parameters, i.e., $\alpha$>0, $\beta$>0.

Positive parameters $\alpha$, $\beta$ may be known. Positive parameters $\alpha$, $\beta$ may be determined by X.

According to Eq. 11, the greater the speeds of bodies, the more likely the conflict between the bodies will be a collision. The smaller the separation of the bodies, the more likely the conflict between the bodies will be a collision. When $V_1$=0 and/or $V_2$=0, and d>0, the affinity of collision measure equals zero, indicating no risk of collision between the bodies.

At step 164, a proximity to collision (PTC) of the bodies may be determined based on the affinity to collision. The proximity to collision may comprise an inverse of the affinity to collision, as expressed in Eq. 12.

$$PTC = \frac{1}{ATC} = \frac{d^\beta}{\alpha V_1 \cdot V_2} \tag{12}$$

Figure 19:
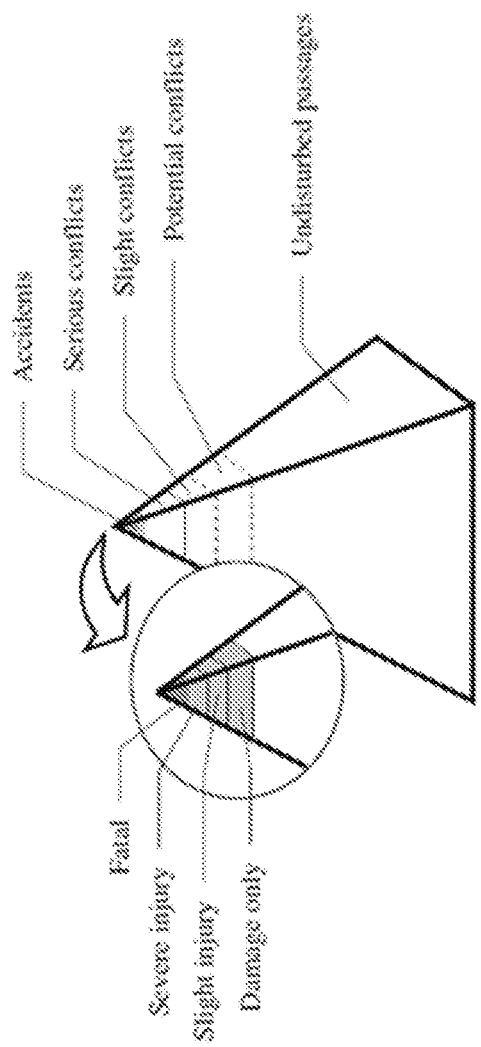
FIG. 19 shows an example conflict frequency pyramid.
Figure 20:
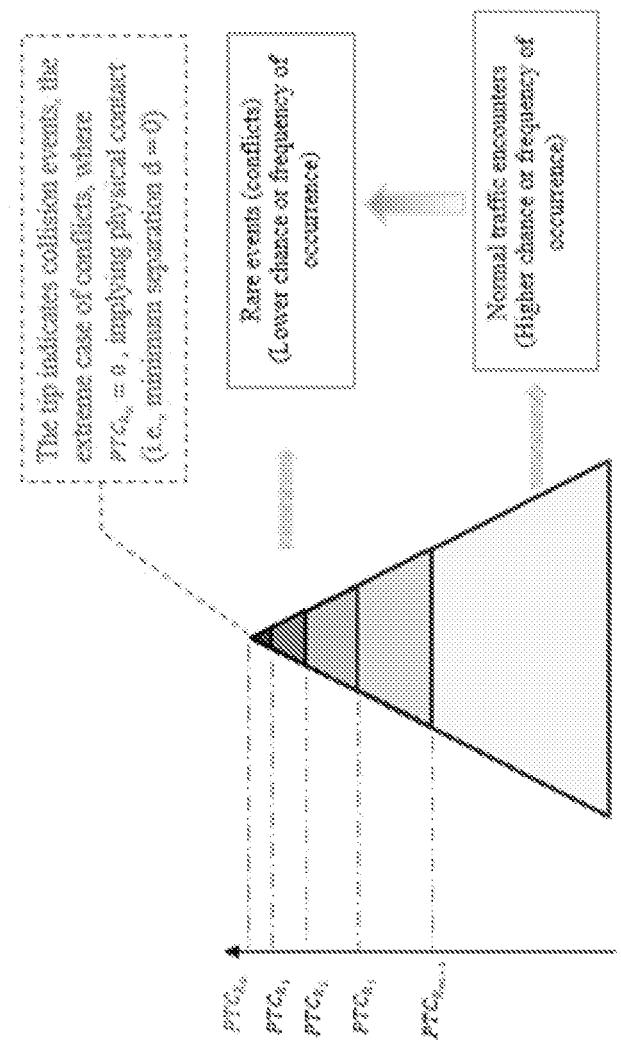
FIG. 20 shows an example conflict frequency pyramid.

According to Eq. 12, a collision occurs if the proximity to collision equals 0. The greater the proximity to collision, the less likely a collision between the bodies is to occur. FIG. 19 shows Hyden's Safety Pyramid, which correlates crash and conflict severity to the frequency of conflict occurrence. According to the pyramid, the higher the severity, the lower the frequency of conflict occurrence. Similarly, proximity to collisions determined from a data set may be sorted in an ascending order. The frequency of occurrence associated with a proximity to collision may resemble the pyramid in FIG. 20. Normal traffic encounters, associated with larger proximity to collision values, are frequent and are represented by the wider base of the pyramid. Traffic conflicts, associated with smaller proximity to collision values, are rarer and are represented by the upper tiers of the pyramid. Severe conflict events are toward the tip of the pyramid. Alternatively, collision may be considered an extreme case of conflict, where proximity to collision equals zero, which is represented by the tip of the pyramid. Proximity to collision may comprise an ordered measure of frequency of traffic encounters.

At step 165, a collision risk may be determined based on the proximity to collision of the bodies. The collision risk may be determined based on a risk function. The risk function may correlate the collision risk and the proximity to collision measure. The risk function may comprise a sigmoid function. Eq. 13 is an example risk function.

$$y = \frac{1}{1+e^{-x}} \tag{13}$$

Figure 21:
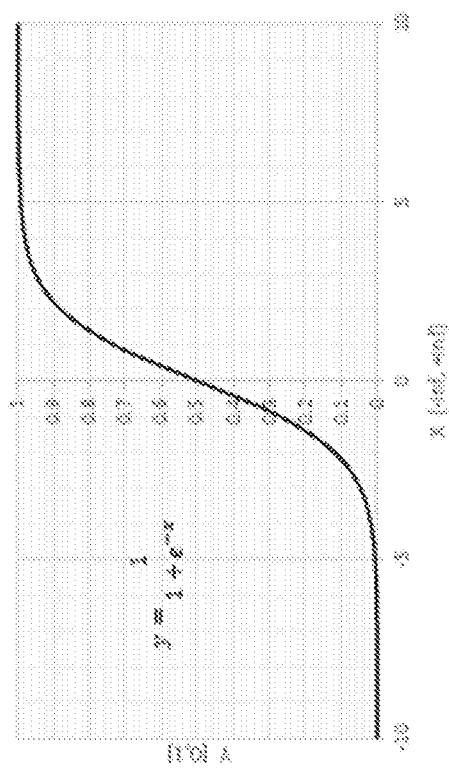
FIG. 21 shows an example risk function plot.

An example plot of the risk function of Eq. 13 is shown in FIG. 21. FIG. 21 maps $x \in (-\infty, +\infty)$ to $y \in [0,1]$. PTC may not be substituted for x in Eq. 13 if PTC$\in [0, +\infty)$. If $$x = \ln\left(\frac{1}{PTC}\right),$$

it maps PTC$\in [0, +\infty)$ to $y \in [0,1]$. Substituting $$x = \ln\left(\frac{1}{PTC}\right)$$

into Eq. 13 yields Eq. 14.

$$y = \frac{1}{1+e^{-\ln\left(\frac{1}{PTC}\right)}} = \frac{1}{1+PTC}, PTC \in [0, +\infty) \tag{14}$$

Figure 22:
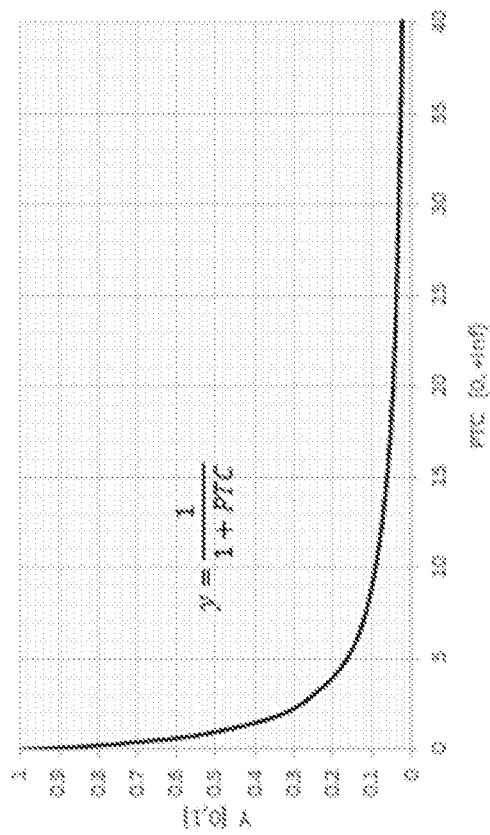
FIG. 22 shows an example risk function plot.

FIG. 22 shows an example plot of Eq. 14.

Quantitatively assessing conflict severity may be based on quantified conflict risk. The collision risk, R, may be expressed by Eq. 15.

$$R(c) = P(\text{collision} | PTC \le c) = \tag{15}$$

$$P(PTC = 0 | PTC \le c) = \frac{P(PTC = 0 \cap PTC \le c)}{P(PTC \le c)} = \frac{P(PTC = 0)}{P(PTC \le c)}$$

Where, c is a particular value of the ordered PTC.

By substituting PTC=c and y=R(c) in Eq. 14, Eq. 16 results.

$$R(c) = \frac{1}{1+e^{-\ln\left(\frac{1}{c}\right)}} = \frac{1}{1+c}, c \in [0, +\infty) \tag{16}$$

As seen, as PTC increases, the risk may decrease. Considering the boundary conditions, when c=0, R(c=0)=1, indicating a collision occurred, as c approaches infinity, R(c≈+∞)≈0.

Based on Eq. 15 and Eq. 14, Eq. 17 may be derived.

$$R(c) = \frac{P(PTC = 0)}{P(PTC \le c)} = \frac{1}{1+c}, c \in [0, +\infty) \tag{17}$$

The risk function of Eq. 15 may be cumulative with respect to PTC. An instant risk, r(c) may be defined. For example, the instant risk may be defined as the derivative of R(c), as show in Eq. 18.

$$r(PTC = c) = \frac{dR(c)}{dc} = \frac{-1}{(1+c)^2} \tag{18}$$

Figure 23:
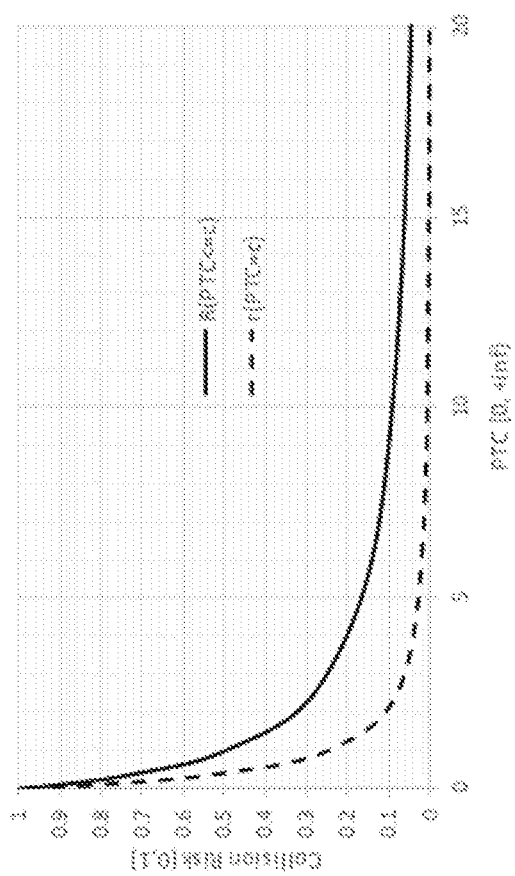
FIG. 23 shows an example risk function plot.

The negative sign in Eq. 18 indicates that risk increases as c decreases. In addition, r increases to 1 (in magnitude) as c approaches 0. In other words, R(c=0)=r(c=0)=1. The cumulative and instant risk functions, expressed by Eqs. 17 and 18, are plotted in FIG. 23. By substituting Eq. 12 into Eq. 17, the R(c) becomes a function of d, $V_1$ and $V_2$, as expressed by Eq. 19.

$$R(c) = R(d, V_1, V_2) = \frac{1}{1 + \frac{d^\beta}{\alpha V_1 \cdot V_2}} \tag{19}$$

Eq. 18 may also be written in terms of ATC, as expressed by Eq. 20. The negative sign is removed because of increasing risk function with respect to ATC.

$$r\left(ATC = \frac{1}{c}\right) = \frac{dR(c)}{dc} = \frac{1}{(1+c)^2} \tag{20}$$

The parameters $\alpha$ and $\beta$ may be calibrated or estimated. Based on Eq. 19 and Eq. 17, Eq. 21 may be derived.

$$R(c) = \frac{P(PTC = 0)}{P(PTC \le c)} = \frac{1}{1 + \frac{d^\beta}{\alpha V_1 \cdot V_2}} \tag{21}$$

Eq. 21 may be rearranged to yield Eq. 22.

$$\frac{d^\beta}{\alpha V_1 V_2} = \frac{1}{R(c)} - 1 = \frac{1 - R(c)}{R(c)} \tag{22}$$

By taking natural logarithm on both sides of Eq. 22, Eq. 23 may be derived.

$$\beta \ln(d) - \ln(\alpha) - \ln(V_1 V_2) = \ln\left[\frac{1 - R(c)}{R(c)}\right] \tag{23}$$

Eq. 23 may be arranged to yield Eq. 24.

$$\beta \ln(d) - \ln(\alpha) = \ln\left[\frac{1 - R(c)}{R(c)} \cdot V_1 V_2\right] \tag{24}$$

If the collision risk order shown in FIG. 19 was preserved by the order of observed conflict event frequencies as expressed by Eq. 21, R(c), which may be unobservable, may be estimated based on the observed frequencies of conflict events at different PTC levels using Eq. 25.

$$R(c) = \frac{P(c = 0)}{P(C < c)} = \frac{\text{Freqency of collisoins}}{\text{Cumulative Frequency up to conflict level at } c} \tag{25}$$

At step 166, an indication of the collision risk may be transmitted to a computing device. For example, the indication of the collision risk may be transmitted to the computing device if the collision risk is equal or greater than a threshold risk. For example, the threshold may comprise R(c)=0.5, 0.6, 0.7, 0.8, 0.9, 0.95, 0.98, or another value. The computing device may comprise a mobile device or a user device. The computing device may comprise a traffic control device. The computing device may comprise a device in an autonomous vehicle. The computing device that determines the conflict risk may cause the conflict risk to be output via a user interface. The user interface may comprise an application on a mobile device, for example. The computing device may cause the user interface to output a graphic representation based on the conflict risk. The graphic representation may comprise a model, such as the model shown in any of FIG. 4A-4D, 5A-5E, or 17. The graphic representation may comprise an overlay. The overlay may comprise the trajectories of the bodies. The overlay may be output over an image of a roadway, such as from the image data. The graphic representation may comprise an animated graphic, such as an animation of the trajectories of the bodies. The animated graphic may comprise a simulation of the collision that may occur if the bodies did not deviate from their trajectories.

Alternatively or in addition, at step 166, the quantitative assessment of traffic conflicts may be used to execute proactive road safety measures to minimize the probability of traffic conflicts. For example, based on the determined conflict risk, traffic control devices may be caused to execute operations. As an example, a traffic light may be caused to change color. Alternatively, a traffic light may be caused to remain the same color for a period of time. An audio or visual warning may be caused to be output. A traffic barrier may be deployed or removed.

Alternatively or in addition, at step 166, an autonomous vehicles may perform operations based on the quantitative assessment of traffic conflicts. A device installed in the autonomous vehicle may perform the method described in FIG. 16. For example, based on the determined risk of a traffic conflict, an autonomous vehicle may autocorrect its course. The autonomous vehicle may change its speed or direction. The self-driving vehicle may move outside the determined minimum separation with respect to another vehicle or body. The autonomous vehicle may communicate with another device or vehicle, such as a human-operated vehicle or another autonomous vehicle.

Assuming that speeds ($V_1$ and $V_2$) and separation (d) data have been obtained based on extracted trajectories from an input source (e.g., video), the method shown in FIG. 16 may be used to estimate parameters $\alpha$, $\beta$. At step 240, parameters $\alpha$, $\beta$ may be initialized. For example, parameters $\alpha$, $\beta$ may be set to $\alpha=1$, $\beta=1$. FIG. 24 shows an example parameter calibration method. At step 241, PTC may be determined for N observations, where N is the sample size. The PTC may be determined using Eq. 12. At step 242, the observations may be sorted by PTC. For example, the observations may be sorted in an ascending order. Table 2 shows example observations sorted by PTC in ascending order.

TABLE 2

| Observation | $V_1$ | $V_2$ | $V_1 \cdot V_2$ | Minimum Separation (d) | PTC |
|---|---|---|---|---|---|
| 1 | $V_{1,1}$ | $V_{2,1}$ | $V_{1,1} \cdot V_{2,1}$ | $d_0$ | $PTC_1$ |
| 2 | $V_{1,2}$ | $V_{2,2}$ | $V_{1,2} \cdot V_{2,2}$ | $d_1$ | $PTC_2$ |
| ... | ... | ... | ... | ... | ... |
| N | $V_{1,N}$ | $V_{2,N}$ | $V_{1,N} \cdot V_{2,N}$ | $d_N$ | $PTC_N$ |

At step 243, a cluster analysis may be performed on the sorted PTC. For example, a K-mean cluster analysis may be performed. The number of clusters or sampling points (m) may depend on the desired model accuracy level and sample size N. Table 3 shows the values of Table 2, which have been clustered.

TABLE 3

| Observation | Cluster | $V_1$ | $V_2$ | $V_1 \cdot V_2$ | Minimum Separation (d) | PTC |
|---|---|---|---|---|---|---|
| 1 | 1 | $V_{1,1}$ | $V_{2,1}$ | $V_{1,1} \cdot V_{2,1}$ | $d_1$ | $PTC_1$ |
| 2 | 1 | $V_{1,2}$ | $V_{2,2}$ | $V_{1,2} \cdot V_{2,2}$ | $d_2$ | $PTC_2$ |
| ... | ... | ... | ... | ... | ... | ... |
| $k_0$ | 1 | $V_{1,k_0}$ | $V_{2,k_0}$ | $V_{1,k_0} \cdot V_{2,k_0}$ | $d_{k_0}$ | $PTC_{k_0}$ |
| $k_0 + 1$ | 2 | $V_{1,k_0+1}$ | $V_{2,k_0+1}$ | $V_{1,k_0+1} \cdot V_{2,k_0+1}$ | $d_{k_0+1}$ | $PTC_{k_0+1}$ |
| ... | ... | ... | ... | ... | ... | ... |
| $k_1$ | 2 | $V_{1,k_1}$ | $V_{2,k_1}$ | $V_{1,k_1} \cdot V_{2,k_1}$ | $d_{k_1}$ | $PTC_{k_1}$ |
| $k_1 + 1$ | 3 | $V_{1,k_1+1}$ | $V_{2,k_1+1}$ | $V_{1,k_1+1} \cdot V_{2,k_1+1}$ | $d_{k_1+1}$ | $PTC_{k_1+1}$ |
| ... | ... | ... | ... | ... | ... | ... |
| $k_2$ | 3 | $V_{1,k_2}$ | $V_{2,k_2}$ | $V_{1,k_2} \cdot V_{2,k_2}$ | $d_{k_2}$ | $PTC_{k_2}$ |
| $k_2 + 1$ | 4 | $V_{1,k_2+1}$ | $V_{2,k_2+1}$ | $V_{1,k_2+1} \cdot V_{2,k_2+1}$ | $d_{k_2+1}$ | $PTC_{k_2+1}$ |
| ... | ... | ... | ... | ... | ... | ... |
| ... | ... | ... | ... | ... | ... | ... |
| $k_{(m-1)}$ (N) | m | $V_{1,k_{(m-1)}}$ | $V_{2,k_{(m-1)}}$ | $V_{1,k_{(m-1)}} \cdot V_{2,k_{(m-1)}}$ | $d_{k_{(m-1)}}$ | $PTC_{k_{(m-1)}}$ |

As shown in Table 3, there may be m clusters from N observations. The last (largest) PTC value for each cluster may be used for calibration.

Instead of clustering, a systematic sampling approach may be used, where the points for calibration may be selected from the sorted data in a systematic fashion (e.g., every 20 observations). However, the cluster approach may have the advantage of capturing feature points of the data set, such as points associated with sudden changes or jumps in PTC values. The first cluster may comprise all actual collisions in the data set. If the first cluster does not comprise all actual collision in the data set, the collision observations may be extracted first manually as a separate cluster and then cluster analysis may be performed on the remaining conflict data.

At step 244, the feature points may be extracted and frequency per cluster may be determined. The frequency per cluster may be determined based on the number of observations in each cluster. Table 4 shows example frequency computations of the values in Table 3.

The first row (subscript $k_0$) in Table 5 corresponds to collision observations for which $PTC_{k_0}=0$. Collision observations may be used for estimating collision risk. By assuming that the order of risk is preserved by the order PTC as defined, the cumulative collision risk, R(PTC), maybe estimated as the ratio of collision frequency to cumulative frequencies, as shown in the last column of Table 5.

TABLE 5

| c | $V_2$ | $V_1 \cdot V_2$ | Minimum Separation (d) | PTC | Frequency |
|---|---|---|---|---|---|
| $V_{1,k_0}$ | $V_{2,k_0}$ | $V_{1,k_0} \cdot V_{2,k_0}$ | $d_{k_0}$ | $PTC_{k_0}$ | $f_{k_0} = k_0$ |
| $V_{1,k_1}$ | $V_{2,k_1}$ | $V_{1,k_1} \cdot V_{2,k_1}$ | $d_{k_1}$ | $PTC_{k_1}$ | $f_{k_1} = k_1 - k_0$ |
| ... | ... | ... | ... | ... | ... |
| $V_{1,k_j}$ | $V_{2,k_j}$ | $V_{1,k_j} \cdot V_{2,k_j}$ | $d_{k_j}$ | $PTC_{k_j}$ | $f_{k_j} = k_j - k_{(j-1)}$ |
| ... | ... | ... | ... | ... | ... |
| $V_{1,k_{(m-1)}}$ | $V_{2,k_{(m-1)}}$ | $V_{1,k_{(m-1)}} \cdot V_{2,k_{(m-1)}}$ | $d_{k_{(m-1)}}$ | $PTC_{k_{(m-1)}}$ | $f_{k_{(m-1)}} = k_{(m-1)} - k_{(m-2)}$ |

Note:
summation of all frequencies is equal to the number of total observations, N.
$$\sum_{i=0}^{m-1} f_{k_i} = k_{(m-1)} = N$$

At step 245, cumulative frequencies and cumulative collision risk may be determined. Table 5 shows example cumulative frequencies and cumulative collision risks calculated for the values in Table 4.

At step 246, a least square method may be applied to estimate parameters $\alpha$, $\beta$. For example, the least square method may be applied based on Eq. 24. Columns 3, 4, and

TABLE 5

| $V_1$ | $V_2$ | $V_1 \cdot V_2$ | Minimum Separation (d) | PTC | Frequency | Cumulative Frequency | Cumulative Risk |
|---|---|---|---|---|---|---|---|
| $V_{1,k_0}$ | $V_{2,k_0}$ | $V_{1,k_0} \cdot V_{2,k_0}$ | $d_{k_0}$ | $PTC_{k_0}$ | $f_{k_0}$ | $F_{k_0} = f_{k_0}$ | $R(PTC_{k_0}) = \dfrac{F_{k_0}}{F_{k_0}}$ |
| $V_{1,k_1}$ | $V_{2,k_1}$ | $V_{1,k_1} \cdot V_{2,k_1}$ | $d_{k_1}$ | $PTC_{k_1}$ | $f_{k_1}$ | $F_{k_1} = f_{k_0} + f_{k_1}$ | $R(PTC_{k_1}) = \dfrac{F_{k_0}}{F_{k_1}}$ |
| ... | ... | ... | ... | ... | ... | ... | ... |
| $V_{1,k_j}$ | $V_{2,k_j}$ | $V_{1,k_j} \cdot V_{2,k_j}$ | $d_{k_j}$ | $PTC_{k_j}$ | $f_{k_j}$ | $F_{k_j} = \sum_{i=0}^{j} f_{k_i}$ | $R(PTC_{k_j}) = \dfrac{F_{k_0}}{F_{k_j}}$ |
| ... | ... | ... | ... | ... | ... | ... | ... |
| $V_{1,k_{(m-1)}}$ | $V_{2,k_{(m-1)}}$ | $V_{1,k_{(m-1)}} \cdot V_{2,k_{(m-1)}}$ | $d_{k_{(m-1)}}$ | $PTC_{k_{(m-1)}}$ | $f_{k_{(m-1)}}$ | $F_{k_{(m-1)}} = \sum_{i=0}^{m-1} f_{k_i}$ | $R(PTC_{k_{(m-1)}}) = \dfrac{F_{k_0}}{F_{k_{(m-1)}}}$ |

8 of Table 5 may be extracted, as shown in the first three columns in Table 6.

TABLE 6

| $V_1 \cdot V_2$ | d | Cumulative Risk | ln(d) | $\ln\left[\dfrac{1-R(c)}{R(c)} V_1 V_2\right]$ |
|---|---|---|---|---|
| $V_{1,k_1} V_{2,k_1}$ | $d_{k_1}$ | $R(PTC_{k_1}) = \dfrac{F_{k_0}}{F_{k_1}}$ | $\ln(d_{k_1})$ | $\ln\left[\dfrac{1-R(PTC_{k_1})}{R(PTC_{k_1})} V_{1,k_1} V_{2,k_1}\right]$ |
| ... | ... | ... | ... | ... |

TABLE 6-continued

| $V_1 \cdot V_2$ | d | Cumulative Risk | ln(d) | $\ln\left[\frac{1-R(c)}{R(c)}V_1V_2\right]$ |
|---|---|---|---|---|
| $V_{1,k_j}V_{2,k_j}$ | $d_{k_j}$ | $R(PTC_{k_j}) = \frac{F_{k_0}}{F_{k_j}}$ | $\ln(d_{k_j})$ | $\ln\left[\frac{1-R(PTC_{k_j})}{R(PTC_{k_j})}V_{1,k_j}V_{2,k_j}\right]$ |
| ... | ... | ... | ... | ... |
| $V_{1,k_{(m-1)}}V_{2,k_{(m-1)}}$ | $d_{k_{(m-1)}}$ | $R(PTC_{k_{(m-1)}}) = \frac{F_{k_0}}{F_{k_{(m-1)}}}$ | $\ln(d_{k_{(m-1)}})$ | $\ln\left[\frac{1-R(PTC_{k_{(m-1)}})}{R(PTC_{k_{(m-1)}})}V_{1,k_{(m-1)}}V_{2,k_{(m-1)}}\right]$ |

By transforming the data in the first three columns using Eq. 24, the last two column of Table 6 may be determined. (The computation based on the first row in Table 5 was removed in Table 6 because $$\ln\left[\frac{1-R(PTC_{k_0})}{R(PTC_{k_0})}V_{1,k_0}V_{2,k_0}\right] = \ln(0) = -\infty.)$$

Using Eq. 23 and the last two columns in Table 6, simple linear regression may be performed to estimate the two parameters: $\ln(\alpha)$ (intercept) and $\beta$ (slope). The solution may be expressed in matrix form, as shown Eq. 26.

$$X = \begin{bmatrix} -1 & \ln(d_{k_1}) \\ -1 & \ln(d_{k_2}) \\ & \cdot \\ & \cdot \\ & \cdot \\ -1 & \ln(d_{k_{(m-1)}}) \end{bmatrix}_{(m-1)\times 2} \quad (26)$$

$$Y = \begin{bmatrix} \ln\left[\frac{1-R(PTC_{k_1})}{R(PTC_{k_1})}V_{1,k_1}V_{2,k_1}\right] \\ \ln\left[\frac{1-R(PTC_{k_2})}{R(PTC_{k_2})}V_{1,k_2}V_{2,k_2}\right] \\ \cdot \\ \cdot \\ \cdot \\ \ln\left[\frac{1-R(PTC_{k_{(m-1)}})}{R(PTC_{k_{(m-1)}})}V_{1,k_{(m-1)}}V_{2,k_{(m-1)}}\right] \end{bmatrix}_{(m-1)\times 1}$$

$$b = \begin{bmatrix} \ln(\alpha) \\ \beta \end{bmatrix}_{2\times 1}$$

If the inverse of X'X exists, the solution may be obtained as $b=(X'X)^{-1}X'Y$. Otherwise, ridge regression may be performed by introducing a small constant value, $\lambda$, to penalizing large parameter values and the solution becomes $b=(X'X+\lambda I)^{-1}X'Y$, where I is the 2×2 identity matrix.

At step 247, the estimated parameter values may be compared with the estimated parameter values from a previous iteration. To illustrate, if the $\alpha$, $\beta$ values from two successive iterations are similar (i.e., the difference is less than a predetermined threshold), it may be determined that the estimated parameter values $\alpha$, $\beta$ are accurate and may be used in the disclosed equations. If the $\alpha$, $\beta$ values from two successive iterations are not similar, step 240 may be repeated and the parameters may be initialized to the newly estimated $\alpha$, $\beta$ for the next iteration. The regression residuals, such as the sum of square errors, may be checked for verification.

Table 7 shows a simulated data set with a sample size N=1000.

TABLE 7

| $V_1$ (miles/hour) | $V_2$ (miles/hour) | d* (separation measured in the spatiotemporal domain) |
|---|---|---|
| 20 | 45 | 0 |
| 22 | 57 | 0 |
| 24 | 32 | 25 |
| 31 | 12 | 55 |
| 25 | 28 | 37 |
| 35 | 7 | 108 |
| ... | ... | ... |
| ... | ... | ... |
| 36 | 46 | 120 |
| 37 | 41 | 131 |
| 39 | 44 | 116 |
| 38 | 49 | 107 |
| 41 | 34 | 143 |
| 27 | 52 | 142 |

Separation d may be measured in the spatiotemporal domain, such as by using Eq. 9. It may also be converted to either spatial (e.g., in unit of foot) or temporal (e.g., in unit of millisecond) by multiplying the temporal component by the relative speed (between two approaching vehicles) or dividing the spatial component by the relative speed. The first two observations, in the first two rows, indicate collision events since d=0.

Figure 25:
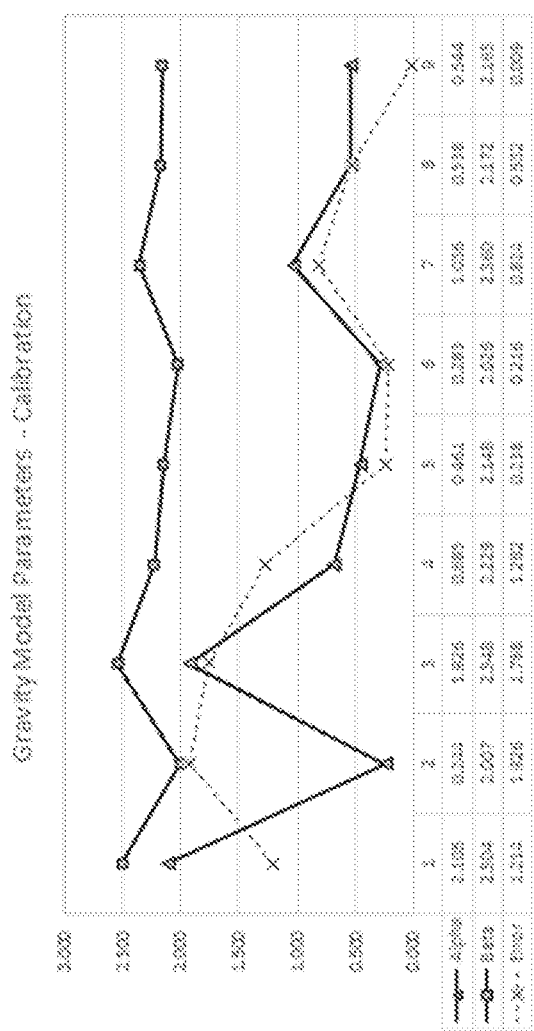
FIG. 25 shows an example parameter calibration plot.
Figure 26:
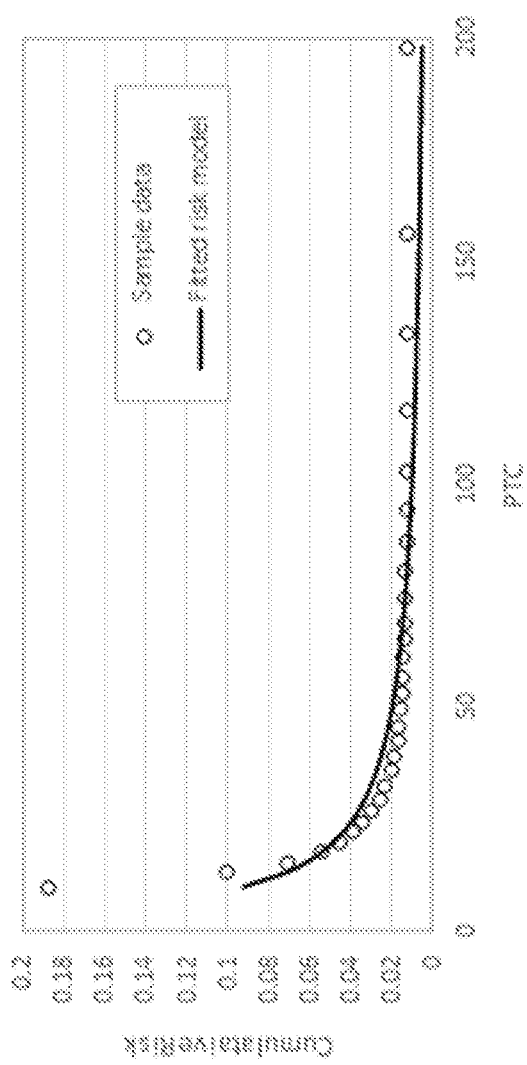
FIG. 26 shows an example cumulative risk plot.
Figure 27:
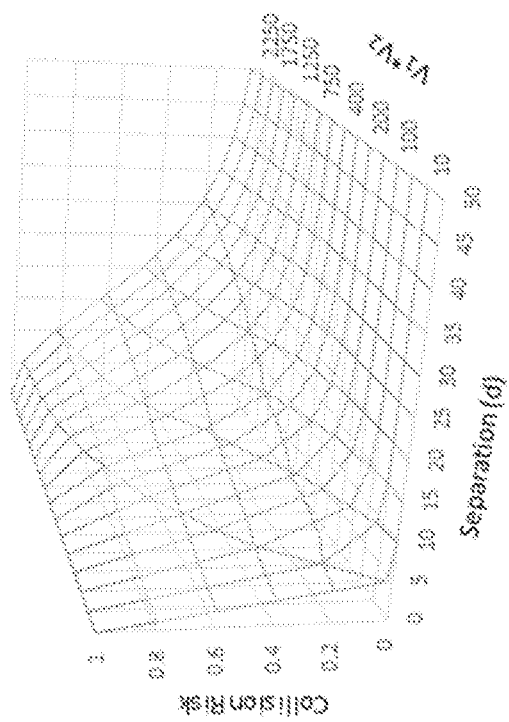
FIG. 27 shows an example collision risk plot.
Figure 28:
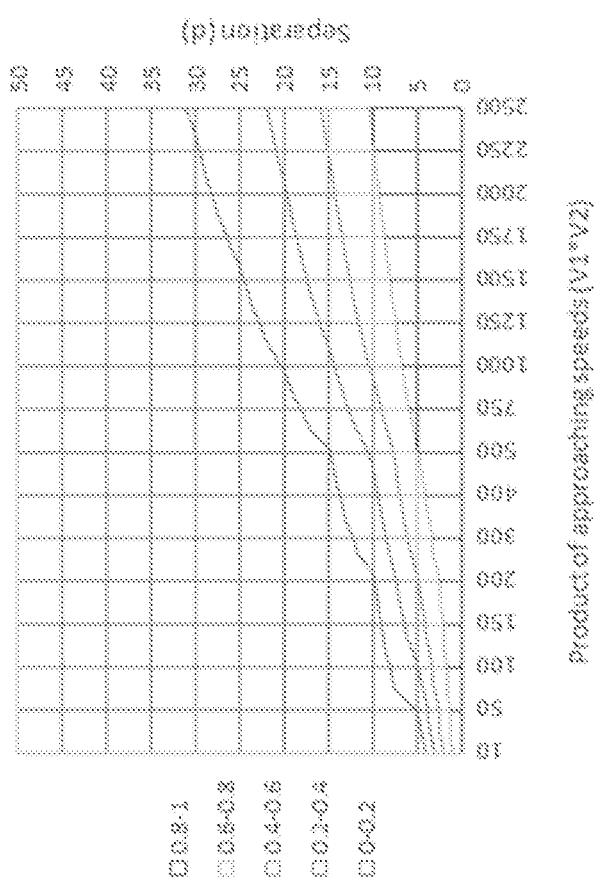
FIG. 28 shows an example minimum separation plot.

FIG. 25 shows the result of the method described in FIG. 24 applied to the sample data set in Table 7. As seen in FIG. 25, with initial values of $\alpha=1$ and $\beta=2$, the process ended after nine iterations when the error in parameter estimates between two successive iterations fell below a predetermined threshold (e.g., 0.01). As a result, the parameter estimates are $\alpha=0.544$ and $\beta=2.165$. The error is computed as: Error=$\sqrt{(\alpha_k-\alpha_{k-1})^2+(\beta_k-\beta_{k-1})^2}$, where subscript k indexes the iteration number. FIG. 26 shows the risk model fitted to the "feature points" (derived as cluster boundary points) in the sample data with the determined parameter values. FIG. 27 shows a risk surface and contour, based on the determined parameter values, plotted with respect to separation (d). FIG. 28 shows a risk surface and contour, based on the determined parameter values, plotted with respect to speed product ($V_1 * V_2$).

The method described in FIG. 24 may be applied to different types of conflicts, such as estimating conflict-type-specific parameters, because the minimum separation (d) and prevailing speeds ($V_1$ and $V_2$) may vary by conflict types even at the same risk level. Example conflict types are shown in Table 8. Separate parameters may be estimated for the different conflict types.

TABLE 8

| Conflict Type | Parameters | |
| --- | --- | --- |
| Left Turn | $\alpha_L$ | $\beta_L$ |
| Angle | $\alpha_A$ | $\beta_A$ |
| Side swipe (same direction) | $\alpha_S$ | $\beta_S$ |
| Head on | $\alpha_H$ | $\beta_H$ |
| Rear end | $\alpha_R$ | $\beta_R$ |

A severity of a conflict may be quantitatively assessed. Quantitatively assessing the severity of a conflict may use inconsequential traffic conflict data. Inconsequential traffic conflict data may comprise data associated with motion of objects in traffic that did not result in a collision or crash. The severity may be based on two aspects: (1) the probability (risk) of collision, and (2) the likely consequence if a collision occurred. For the first aspect, the collision risk may be determined using the method in FIG. 24. For the second aspect, velocity difference may be used. Conflict severity may be determined using Eq. 27.

$$\text{Conflict Severity} = P(\text{Collision}|PTC=c) \cdot |\overrightarrow{\Delta V}| = r(c) \cdot |\overrightarrow{\Delta V}| \quad (27)$$

where, r(c)=risk of collision when PTC=c (Refer to Eq. 10)

Figure 17:
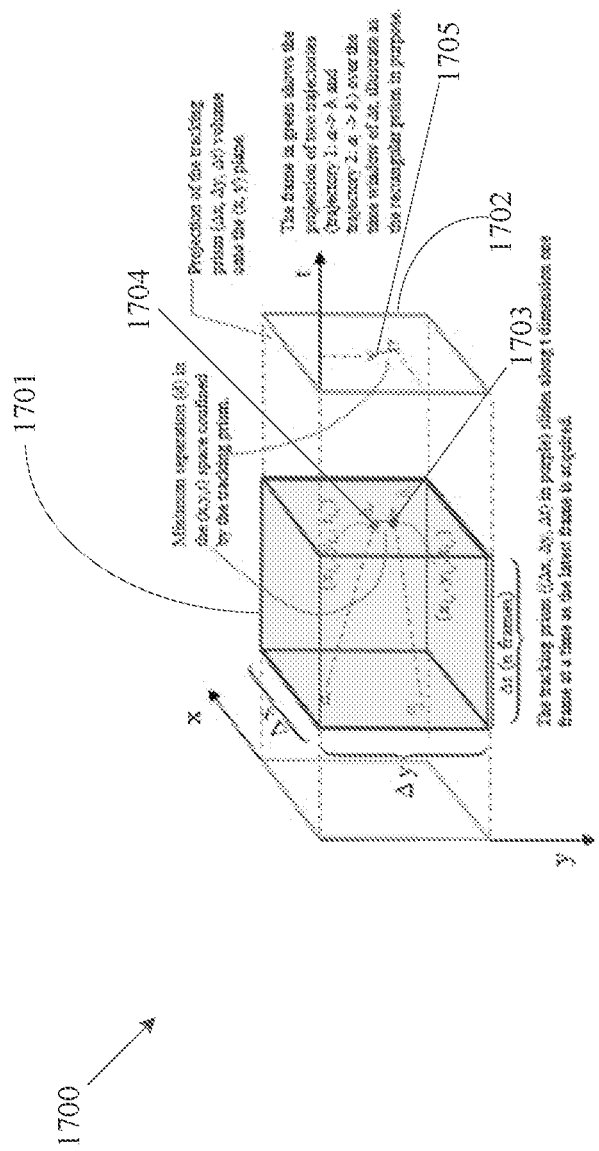
FIG. 17 shows an example relative velocity determination with trajectories.

$|\overrightarrow{\Delta V}| = \sqrt{|\overrightarrow{V_i}|^2 |\overrightarrow{V_j}| - 2|\overrightarrow{V_i}||\overrightarrow{V_j}|\cos(\theta)}$; $\theta$=Angle formed by $\overrightarrow{V_i}$ and $\overrightarrow{V_j}$ Velocity $\overrightarrow{V_i}$ and $\overrightarrow{V_j}$ may be determined based on the portion of trajectories prior to the conflict points, as shown in FIG. 17. A conflict point may comprise as a point on one of the two conflicting trajectories, where the minimum separation (d) between the two trajectories was measured. As shown in FIG. 17, the line 1705 indicates the minimum separation (d) between the two conflict trajectories captured in the tracking prism. The two conflict points (one on each trajectory) are the points at which the line 1705 was connected.

Figure 29:
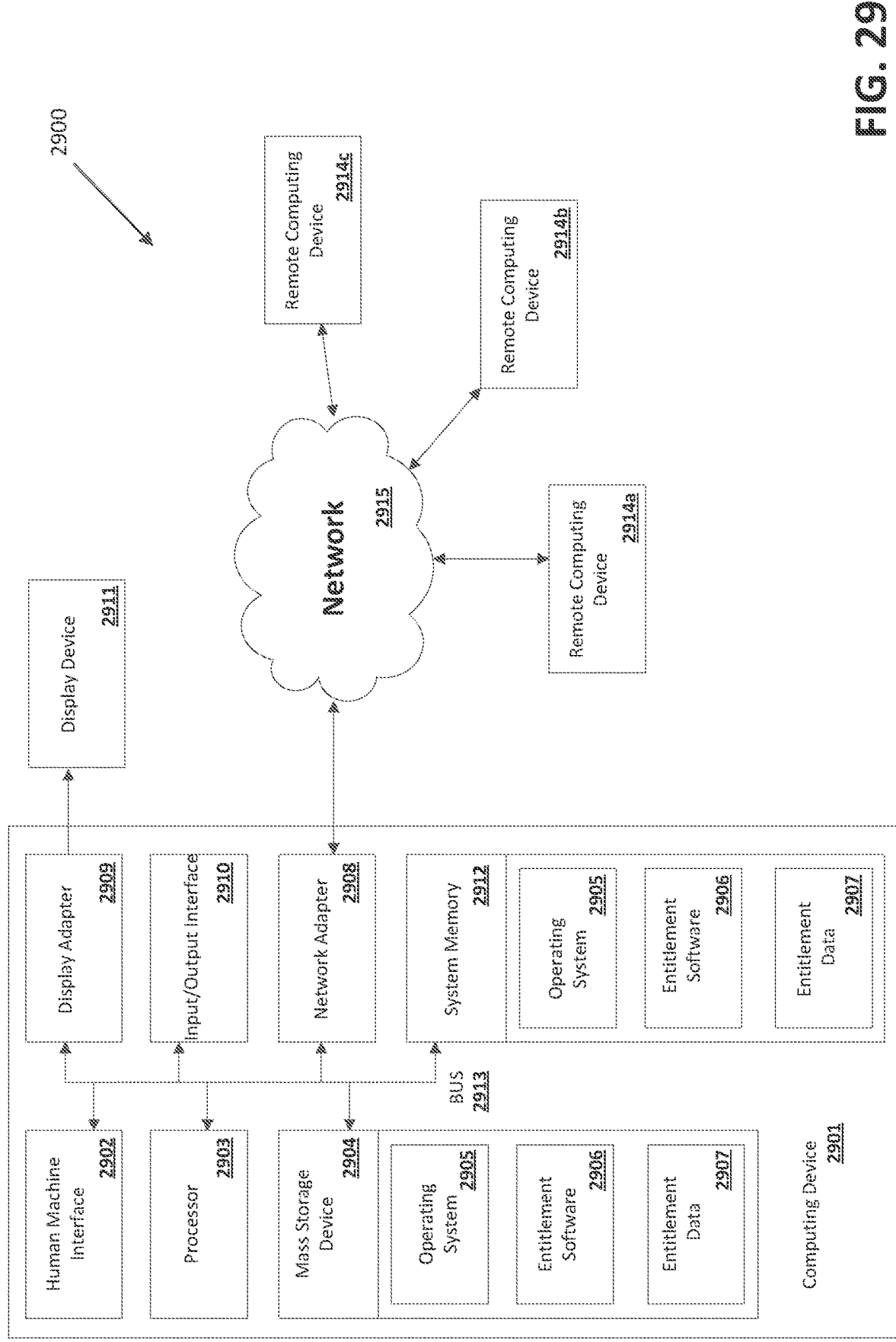
FIG. 29 shows an example computing environment.

FIG. 29 shows a block diagram illustrating an example operating environment 2900 for performing the disclosed systems and methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems may be operational with numerous other general purpose or special purpose computing system environments or configurations. Examples of well-known computing systems, environments, and/or configurations that may be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems may be performed by software components. The disclosed systems and methods may be described in the general context of computer-executable instructions, such as program modules, being executed by one or more computers or other devices. Generally, program modules comprise computer code, routines, programs, objects, components, data structures, etc. that performs particular tasks or implement particular abstract data types. The disclosed methods may also be practiced in grid-based and distributed computing environments where tasks are performed by remote processing devices that are linked through a communications network. In a distributed computing environment, program modules may be located in both local and remote computer storage media including memory storage devices.

Further, one skilled in the art will appreciate that the systems and methods disclosed herein may be implemented via a general-purpose computing device in the form of a computing device 2901. The components of the computing device 2901 may comprise, but are not limited to, one or more processors or processing units 2903, a system memory 2912, and a system bus 2913 that couples various system components including the processor 2903 to the system memory 2912. In the case of multiple processing units 2903, the system may utilize parallel computing.

The system bus 2913 represents one or more of several possible types of bus structures, including a memory bus or memory controller, a peripheral bus, an accelerated graphics port, and a processor or local bus using any of a variety of bus architectures. By way of example, such architectures may comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 2913, and all buses specified in this description may also be implemented over a wired or wireless network connection and each of the subsystems, including the processor 2903, a mass storage device 2904, an operating system 2905, entitlement software 2906, entitlement data 2907, a network adapter 2908, system memory 2912, an Input/Output Interface 2910, a display adapter 2909, a display device 2911, and a human machine interface 2902, may be contained within one or more remote computing devices 2914a,b,c at physically separate locations, connected through buses of this form, in effect implementing a fully distributed system.

The computing device 2901 typically comprises a variety of computer readable media. Exemplary readable media may be any available media that is accessible by the computing device 501 and comprises, for example and not meant to be limiting, both volatile and non-volatile media, removable and non-removable media. The system memory 2912 comprises computer readable media in the form of volatile memory, such as random access memory (RAM), and/or non-volatile memory, such as read only memory (ROM). The system memory 2912 typically contains data such as entitlement data 2907 and/or program modules such as operating system 2905 and entitlement software 2906 that are immediately accessible to and/or are presently operated on by the processing unit 2903.

In another aspect, the computing device 2901 may also comprise other removable/non-removable, volatile/non-volatile computer storage media. By way of example, FIG. 29 illustrates a mass storage device 2904 which may provide non-volatile storage of computer code, computer readable instructions, data structures, program modules, and other data for the computing device 2901. For example and not meant to be limiting, a mass storage device 2904 may be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules may be stored on the mass storage device 2904, including by way of example, an operating system 2905 and entitlement software 2906. Each of the operating system 2905 and entitlement software 2906 (or some combination thereof) may comprise elements of the programming and the entitlement software 2906. Entitlement data 2907 may also be stored on the mass storage device 504. Entitlement data 507 may be stored in any of one or more databases known in the art. Examples of such databases comprise, DB2®, Microsoft® Access, Microsoft® SQL Server, Oracle®, mySQL, PostgreSQL, and the like. The databases may be centralized or distributed across multiple systems.

In another aspect, the user may enter commands and information into the computing device 2901 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices may be connected to the processing unit 2903 via a human machine interface 2902 that is coupled to the system bus 2913, but may be connected by other interface and bus structures, such as a parallel port, game port, an IEEE 2994 Port (also known as a Firewire port), a serial port, or a universal serial bus (USB).

In yet another aspect, a display device 2911 may also be connected to the system bus 513 via an interface, such as a display adapter 2909. It is contemplated that the computing device 501 may have more than one display adapter 2909 and the computer 2901 may have more than one display device 2911. For example, a display device may be a monitor, an LCD (Liquid Crystal Display), or a projector. In addition to the display device 2911, other output peripheral devices may comprise components such as speakers (not shown) and a printer (not shown) which may be connected to the computing device 2901 via Input/Output Interface 2910. Any step and/or result of the methods may be output in any form to an output device. Such output may be any form of visual representation, including, but not limited to, textual, graphical, animation, audio, tactile, and the like. The display 2911 and computing device 2901 may be part of one device, or separate devices.

The computing device 2901 may operate in a networked environment using logical connections to one or more remote computing devices 2914a,b,c. By way of example, a remote computing device may be a personal computer, portable computer, a smart phone, a server, a router, a network computer, a peer device or other common network node, and so on. Logical connections between the computing device 2901 and a remote computing device 2914a,b,c may be made via a network 2915, such as a local area network (LAN) and a general wide area network (WAN). Such network connections may be through a network adapter 2908. A network adapter 2908 may be implemented in both wired and wireless environments. Such networking environments are conventional and commonplace in dwellings, offices, enterprise-wide computer networks, intranets, and the Internet.

For purposes of illustration, application programs and other executable program components such as the operating system 2905 are illustrated herein as discrete blocks, although it is recognized that such programs and components reside at various times in different storage components of the computing device 2901, and are executed by the data processor(s) of the computer. An implementation of entitlement software 2906 may be stored on or transmitted across some form of computer readable media. Any of the disclosed methods may be performed by computer readable instructions embodied on computer readable media. Computer readable media may be any available media that may be accessed by a computer. By way of example and not meant to be limiting, computer readable media may comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by a computer.

Aspects

Example 1

A method comprising:

receiving, by a first computing device, image data associated with a first body and a second body;

determining, based on the image data, an affinity (proneness) to collision of the first body and the second body;

determining, based on the determined affinity (proneness) to collision, a proximity (closeness) to collision of the first body and the second body;

determining, based on the determined proximity (closeness) to collision, a collision risk of the first body and the second body; and transmitting, to a second computing device, an indication of the determined collision risk.

Example 2

The method of example 1, further comprising determining, based on the determined collision risk, a severity of conflict associated with the first body and the second body.

Example 3

The method of example 1, further comprising generating, suing the image data, a three-dimensional model of trajectories of the first body and the second body.

Example 4

The method of example 3, wherein the determining the affinity (proneness) to collision of the first body and the second body is based on the trajectories.

Example 5

The method of example 3, further comprising causing an indication of the three-dimensional model to output via a user interface.

Example 6

The method of example 1, further comprising causing an overlay indicative of the determined collision risk to output via a graphic user interface.

Example 7

The method of example 1, wherein the determining the affinity (proneness) to collision is based at least on a first velocity of the first body and a second velocity of the second body determined from the image data.

Example 8

The method of example 7, wherein the determining the affinity (proneness) to collision is further based at least on a displacement between the first body and the second body determined from the image data.

Example 9

The method of example, wherein the affinity (proneness) to collision comprises a quotient, wherein a dividend of the quotient comprises a product of the first velocity and the second velocity, and wherein a divisor of the quotient comprises by the displacement between the first body and the second body.

Example 10

The method of example 1, wherein the determining the proximity (closeness) to collision comprises determining an inverse of the affinity (proneness) to collision.

Example 11

The method of example 1, further comprising causing, based on the determined collision risk, a traffic control device to execute an operation.

Example 12

The method of example 11, wherein the operation comprises outputting an alert.

Example 13

The method of example 11, wherein the operation comprises modifying a state of a traffic control signal.

Example 14

The method of example 11, wherein the operation comprises deploying a traffic barrier.

Example 15

The method of example 1, further comprising causing, based on the determined collision risk, an autonomous vehicle to execute an operation.

Example 16

The method of example 15, wherein the operation comprises a modification of a trajectory of motion of the autonomous vehicle.

Example 17

The method of example 1, wherein the first computing device comprises an autonomous vehicle.

Example 18

The method of example 1, wherein the second computing device comprises an autonomous vehicle.

Example 19

A system comprising:
a first body; and
a second body in communication with the first body, wherein the second body is configured to:
  receive, by a first computing device, image data associated with the first body and the second body;
  determine, based on the image data, an affinity (proneness) to collision of the first body and the second body;
  determine, based on the determined affinity (proneness) to collision, a proximity (closeness) to collision of the first body and the second body;
  determine, based on the determined proximity (closeness) to collision, a collision risk of the first body and the second body; and
  transmit, to the second body, an indication of the determined collision risk.

Example 20

The system of example 19, wherein at least one of the first body or the second body comprises an autonomous vehicle.

Example 21

The system of example 19, wherein the second body is configured to receive the image data from a traffic control device.

Example 22

The system of example 19, wherein the second body is configured to receive the image data from a camera device of the second body.

Example 23

A device comprising:
one or more processors; and
a memory, which when executed by the one or more processors, causes the device to:
  receive, by a first computing device, image data associated with a first body and a second body;
  determine, based on the image data, a proneness to collision of the first body and the second body;
  determine, based on the determined affinity (proneness) to collision, a proximity (closeness) to collision of the first body and the second body;

determine, based on the determined proximity (closeness) to collision, a collision risk of the first body and the second body; and transmit, to a second computing device, an indication of the determined collision risk.

Example 24

A video analytics method comprising the steps of:
obtaining a sequence of real-time images as input from a traffic monitoring system;
identifying a plurality of vehicles within a pre-defined region of interest; and
detecting a conflict event when the vehicles are located between a pre-determined maximum separation threshold and a pre-determined minimum separation threshold based on each vehicles coordinates in a spatial-temporal domain.

Example 25

The video analytics method of example 25, further comprising the step of classifying the conflict event.

Example 26

The video analytics method of example 25, further comprising determining a collision probability based on the pre-determined minimum separation threshold and a pre-determined safe separation threshold.

Example 27

The video analytics method of example 25, wherein the step of detecting a conflict event includes determining a separation measure between the vehicles and comparing the separation measure to the pre-determined maximum separation threshold and the pre-determined minimum separation threshold, the separation measure being determined according to the following equation:

$$d_{i,j}=\sqrt{(x_i-x_j)^2+(y_i-y_j)^2+(t_i-t_j)^2}.$$

Example 28

The video analytics method of example 25, further comprising the step of comparing respective velocities of the vehicles.

Example 29

The video analytics method of example 28, further comprising the step of determining a velocity vector difference, $\Delta v$, using the equation $|\Delta v|=\sqrt{|v_1|^2+|v_2|^2-2|v_1||v_2|\cos(\theta)}$, where $v_1$ is the velocity vector of a first vehicle, $v_2$ is the velocity vector of a second vehicle, and $\Theta$ is the angle between the first velocity vector and the second velocity vector.

Example 30

The video analytics method of example 29, further comprising the steps of:
determining a collision probability based on the temporal-spatial separation of the vehicles; and
determining a conflict severity value by multiplying the collision probability by the magnitude of the velocity vector difference.

Example 31

The video analytics method of example 29, further comprising the step of implementing a corrective action with respect to the region of interest to reduce the collision probability.

Example 32

A method comprising the steps of:
obtaining a spatial and temporal position (x, y, t) of a plurality of moving objects from a video source over a defined tracking prism comprising successive frames;
tracking center points (x, y) of all moving objects and assigning a time stamp (t) relative to the tracking window;
representing the center points (x, y) on a plan view by geospatially referencing the view from the video source onto the plan view, and generating a corresponding sequence of dot-featured image frames on the plan view;
extracting trajectories of moving objects in the tracking prism;
determining a conflict by inspecting trajectories in the tracking prism every time step and determining the separation of the trajectories in the joint spatial-temporal (x, y, t) domain; and
characterizing the conflict based on conflict points in the trajectories.

Example 33

The method of example 32, wherein conflict points are points on conflicting trajectories having a minimum separation measured from, in the (x, y, t) domain, the approaching velocity of each moving object based on the portion of trajectory prior to its conflict point.

Example 34

The method of example 32, further comprising characterizing the conflict based on a conflict type and a conflict severity measure.

Example 35

The method of example 34, wherein the conflict severity measure is determined from a magnitude of difference in velocities of the moving objects and a collision probability function conditional on the separation measure in the (x, y, t) domain.

Example 36

The method of example 32, implemented iteratively by sliding a tracking prism one frame at a time in synchronization with at least one of a live video source and a streaming video source.

Example 37

The method of example 32, where the video source is at least one of a live camera, a network camera, and a recorded video.

Example 38

A video analytics system, comprising:
  at least one camera producing successive images of a region of interest;
  a processor configured to access the images from the at least one camera; and
  a memory operatively coupled to the processor, the memory including instructions that, when executed by the processor, cause the processor to perform the following steps:
    obtaining a sequence of real-time images as input from a traffic monitoring system;
    identifying a plurality of vehicles within a pre-defined region of interest; and
    detecting a conflict event when the vehicles are located between a pre-determined maximum separation threshold and a pre-determined minimum separation threshold based on each vehicles coordinates in a spatial-temporal domain.

Example 39

The video analytics system of example 38, wherein the memory includes additional instructions that, when executed by the processor, cause the processor to perform the step of determining a collision probability based on the pre-determined minimum separation threshold and a pre-determined safe separation threshold.

Example 40

The video analytics system of example 38, wherein the step of detecting a conflict event includes determining a separation measure between the vehicles and comparing the separation measure to the pre-determined maximum separation threshold and the pre-determined minimum separation threshold, the separation measure being determined according to the following equation:

$$d_{i,j} = \sqrt{\omega[(x_i-x_j)^2+(y_i-y_j)^2]+(1-\omega)(t_i-t_j)^2}.$$

Example 41

The video analytics method of example 38, wherein the memory includes additional instructions that, when executed by the processor, cause the processor to perform the step of comparing respective velocities of the vehicles.

Example 42

The video analytics method of example 41, wherein the memory includes additional instructions that, when executed by the processor, cause the processor to perform the step of determining a velocity vector difference, $\Delta v$, using the equation $|\Delta v| = \sqrt{|v_1|^2+|v_2|^2-2|v_1||v_2|\cos(\theta)}$, where $v_1$ is the velocity vector of a first vehicle, $v_2$ is the velocity vector of a second vehicle, and $\Theta$ is the angle between the first velocity vector and the second velocity vector.

Example 43

The video analytics method of example 41, wherein the memory includes additional instructions that, when executed by the processor, cause the processor to perform the steps of:
  determining a collision probability based on the temporal-spatial separation of the vehicles; and
  determining a conflict severity value by multiplying the collision probability by the magnitude of the velocity vector difference.

What is claimed:

1. A method comprising:
  receiving, by a first computing device, image data associated with a first body and a second body;
  determining, based on the image data, an affinity to collision of the first body and the second body, wherein the determining the affinity to collision is further based at least on a displacement between the first body and the second body determined from the image data;
  determining, based on the determined affinity to collision, a proximity to collision of the first body and the second body;
  determining, based on the determined proximity to collision, a collision risk of the first body and the second body; and
  transmitting, to a second computing device, an indication of the determined collision risk.

2. The method of claim 1, further comprising determining, based on the determined collision risk, a severity of conflict associated with the first body and the second body.

3. The method of claim 1, further comprising generating, using the image data, a three-dimensional model of trajectories of the first body and the second body; and
  wherein the determining the affinity to collision of the first body and the second body is based on the trajectories.

4. The method of claim 1, wherein the affinity to collision comprises a quotient, wherein a dividend of the quotient comprises a product of the first velocity and the second velocity, and wherein a divisor of the quotient comprises by the displacement between the first body and the second body.

5. The method of claim 1, wherein the determining the proximity to collision comprises determining an inverse of the affinity to collision.

6. The method of claim 1, further comprising causing, based on the determined collision risk, a traffic control device to execute an operation.

7. The method of claim 6, wherein the operation comprises outputting an alert.

8. The method of claim 1, further comprising causing, based on the determined collision risk, an autonomous vehicle to execute an operation.

9. The method of claim 8, wherein the operation comprises a modification of a trajectory of motion of the autonomous vehicle.

10. A system comprising:
  the first body; and
  the second body in communication with the first body, wherein the second body is configured to perform the method of claim 1, wherein the transmitting the indication of the determined collision risk comprises transmitting, to the first body, the indication of the determined collision risk.

11. The system of claim 10, wherein at least one of the first body or the second body comprises an autonomous vehicle.

12. A device comprising:
  one or more processors; and
  a memory, which when executed by the one or more processors, causes the device to perform the method of claim 1.

13. A video analytics method comprising the steps of:
  obtaining a sequence of real-time images as input from a traffic monitoring system;

identifying a plurality of vehicles within a pre-defined region of interest; and detecting a conflict event when the vehicles are located between a pre-determined maximum separation threshold and a pre-determined minimum separation threshold based on each vehicles coordinates in a spatial-temporal domain; and determining a separation measure between the vehicles and comparing the separation measure to the pre-determined maximum separation threshold and the pre-determined minimum separation threshold.

14. The video analytics method of claim 13, wherein the method further comprises determining a collision probability based on the pre-determined minimum separation threshold and a pre-determined safe separation threshold.

15. The video analytics method of claim 13, wherein the separation measure is being determined according to the following equation:

$$d_{i,j} = \sqrt{\omega[(x_i-x_j)^2+(y_i-y_j)^2]+(1-\omega)(t_i-t_j)^2}.$$

16. The video analytics method of claim 13, wherein the method further comprises determining a velocity vector difference, $\Delta v$, using the equation $|\Delta v| = \sqrt{|v_1|^2+|v_2|^2-2|v_1||v_2|\cos(\theta)}$, where $v_1$ is the velocity vector of a first vehicle, $v_2$ is the velocity vector of a second vehicle, and $\Theta$ is the angle between the first velocity vector and the second velocity vector.

17. A video analytics system, comprising:
at least one camera configured to produce successive images of the pre-defined region of interest;
a processor configured to access the images from the at least one camera; and
a memory operatively coupled to the processor, the memory including instructions that, when executed by the processor, cause the processor to perform the method of claim 13.

18. A method comprising the steps of:
obtaining a spatial and temporal position (x, y, t) of a plurality of moving objects from an image source over a defined tracking prism comprising successive frames;
tracking center points (x, y) of all moving objects and assigning a time stamp (t) relative to the tracking window;
representing the center points (x, y) on a plan view by geospatially referencing the view from the image video source onto the plan view, and generating a corresponding sequence of dot-featured image frames on the plan view;
extracting trajectories of moving objects in the tracking prism;
determining a conflict by inspecting trajectories in the tracking prism every time step and determining the separation of the trajectories in the joint spatial-temporal (x, y, t) domain; and
characterizing the conflict based on conflict points in the trajectories.

19. The method of claim 18, wherein conflict points are points on conflicting trajectories having a minimum separation measured from, in the (x, y, t) domain, the approaching velocity of each moving object based on the portion of trajectory prior to its conflict point.

* * * * *